(12) United States Patent
Hulst et al.

(10) Patent No.: US 8,938,914 B2
(45) Date of Patent: Jan. 27, 2015

(54) SLIDER WINDOW ASSEMBLY WITH CABLE GUIDES

(71) Applicant: Magna Mirrors of America, Inc., Holland, MI (US)

(72) Inventors: Michael J. Hulst, Holland, MI (US); Troy F. Tooker, Allegan, MI (US); Darin J. Snider, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 13/891,613

(22) Filed: May 10, 2013

(65) Prior Publication Data

US 2013/0283693 A1 Oct. 31, 2013

Related U.S. Application Data

(60) Provisional application No. 61/738,094, filed on Dec. 17, 2012, provisional application No. 61/645,962, filed on May 11, 2012.

(51) Int. Cl.
*B60J 1/18* (2006.01)
*E05F 11/48* (2006.01)

(52) U.S. Cl.
CPC ............. *E05F 11/488* (2013.01); *B60J 1/1853* (2013.01)
USPC ................... 49/413; 49/380; 49/352; 49/127; 49/128

(58) Field of Classification Search
CPC ... B60J 1/1853; E05Y 2900/55; E05D 15/535
USPC ............................ 49/413, 380, 352, 128, 127
See application file for complete search history.

(56) References Cited

U.S. PATENT DOCUMENTS

| | | | |
|---|---|---|---|
| 957,728 A | 5/1910 | Bliss |
| 1,204,702 A | 11/1916 | Schupp |
| 2,762,675 A | 9/1956 | Janows |
| 2,858,408 A | 10/1958 | Barroero |
| 2,912,714 A | 11/1959 | Rich |

(Continued)

OTHER PUBLICATIONS

International Search Report and Written Opinion dated May 1, 2012 from corresponding PCT Application No. PCT/US2011/066522.

*Primary Examiner* — Katherine Mitchell
*Assistant Examiner* — Marcus Menezes
(74) *Attorney, Agent, or Firm* — Gardner, Linn, Burkhart & Flory, LLP

(57) ABSTRACT

A slider window assembly for a vehicle includes a frame portion having upper and lower rails, at least one fixed window panel fixed relative to the frame portion, and a movable window panel that is movable along the rails between a closed position and an opened position. The lower rail may comprise a unitarily formed rail having (i) a channel portion that extends at least partially along the fixed window panel and an opening and (ii) a cable guide formed at each end region of the channel portion. A carrier is at a lower portion of the movable window panel and is configured to move along the channel portion of the lower rail. The cable guides are configured to engage or receive a respective sheath of a cable assembly of a cable drive system, with a cable of the cable assembly being attached at the respective end of the carrier.

17 Claims, 20 Drawing Sheets

(56) References Cited

U.S. PATENT DOCUMENTS

| | | |
|---|---|---|
| 2,962,773 A | 12/1960 | Heller |
| 3,177,989 A | 4/1965 | Di Chiaro |
| 3,237,250 A | 3/1966 | Scoville |
| 3,379,859 A | 4/1968 | Marriott |
| 3,508,361 A | 4/1970 | Ryder |
| 3,715,707 A | 2/1973 | Anderson |
| 3,893,260 A | 7/1975 | Cadiou |
| 3,898,427 A | 8/1975 | Levin et al. |
| 3,911,245 A | 10/1975 | O'Shaughnessy |
| 3,964,068 A | 6/1976 | Torii et al. |
| 3,995,142 A | 11/1976 | Ciardelli et al. |
| 4,023,008 A | 5/1977 | Durussel |
| 4,065,848 A | 1/1978 | Dery |
| 4,081,926 A | 4/1978 | Jardin |
| 4,124,054 A | 11/1978 | Spretnjak |
| 4,137,447 A | 1/1979 | Boaz |
| 4,158,270 A | 6/1979 | Cherbourg et al. |
| 4,171,594 A | 10/1979 | Colanzi |
| 4,244,774 A | 1/1981 | Dery |
| RE30,663 E | 6/1981 | Schnitzius |
| 4,388,522 A | 6/1983 | Boaz |
| 4,410,843 A | 10/1983 | Sauer et al. |
| 4,415,196 A | 11/1983 | Baum et al. |
| 4,450,346 A | 5/1984 | Boaz |
| 4,458,445 A | 7/1984 | Sauer et al. |
| 4,519,443 A | 5/1985 | Sutoh et al. |
| 4,552,611 A | 11/1985 | Dery et al. |
| 4,606,159 A | 8/1986 | Kunert |
| 4,611,849 A | 9/1986 | Trenkler |
| 4,635,398 A | 1/1987 | Nakamura |
| 4,674,231 A | 6/1987 | Radek et al. |
| 4,723,809 A | 2/1988 | Kida et al. |
| 4,738,052 A | 4/1988 | Yoshida |
| 4,785,583 A | 11/1988 | Kawagoe et al. |
| 4,883,940 A | 11/1989 | Tokarz |
| 4,920,698 A | 5/1990 | Friese et al. |
| 4,934,098 A | 6/1990 | Prouteau et al. |
| 4,970,911 A | 11/1990 | Ujihara et al. |
| 4,995,195 A | 2/1991 | Olberding et al. |
| 5,046,283 A | 9/1991 | Compeau et al. |
| 5,146,712 A | 9/1992 | Hlavaty |
| 5,228,740 A | 7/1993 | Saltzman |
| 5,245,788 A | 9/1993 | Riegelman |
| 5,294,168 A | 3/1994 | Kronbetter |
| 5,308,247 A | 5/1994 | Dyrdek |
| 5,333,411 A | 8/1994 | Tschirschwitz et al. |
| 5,345,717 A | 9/1994 | Mori et al. |
| 5,363,596 A | 11/1994 | Kronbetter |
| 5,367,827 A | 11/1994 | Taijima et al. |
| 5,442,880 A | 8/1995 | Gipson |
| 5,466,911 A | 11/1995 | Spagnoli et al. |
| 5,467,560 A | 11/1995 | Camp et al. |
| 5,473,840 A | 12/1995 | Gillen et al. |
| 5,505,023 A | 4/1996 | Gillen et al. |
| 5,522,191 A | 6/1996 | Wenner et al. |
| 5,525,401 A | 6/1996 | Hirmer |
| 5,531,046 A | 7/1996 | Kollar et al. |
| 5,542,214 A | 8/1996 | Buening |
| 5,572,376 A | 11/1996 | Pace |
| 5,613,323 A | 3/1997 | Buening |
| 5,617,675 A | 4/1997 | Kobrehel |
| 5,711,112 A | 1/1998 | Barten et al. |
| 5,716,536 A | 2/1998 | Yokoto et al. |
| 5,724,769 A * | 3/1998 | Cripe et al. .................... 49/360 |
| 5,724,771 A | 3/1998 | Gipson |
| 5,784,833 A | 7/1998 | Sponable et al. |
| 5,799,444 A | 9/1998 | Freimark et al. |
| 5,799,449 A | 9/1998 | Lyons et al. |
| 5,822,922 A | 10/1998 | Grumm et al. |
| 5,836,110 A | 11/1998 | Buening |
| 5,853,895 A | 12/1998 | Lewno |
| 5,890,321 A | 4/1999 | Staser et al. |
| 5,953,887 A | 9/1999 | Lucas et al. |
| 5,996,284 A | 12/1999 | Freimark et al. |
| 5,997,793 A | 12/1999 | Lahnala |
| 6,014,840 A | 1/2000 | Ray et al. |
| 6,026,611 A | 2/2000 | Ralston et al. |
| 6,038,819 A | 3/2000 | Klein |
| 6,086,138 A | 7/2000 | Xu et al. |
| 6,112,462 A | 9/2000 | Kolar |
| 6,119,401 A | 9/2000 | Lin et al. |
| 6,119,402 A | 9/2000 | Wisner |
| 6,125,585 A * | 10/2000 | Koneval et al. .................... 49/349 |
| 6,161,894 A | 12/2000 | Chapman |
| 6,223,470 B1 | 5/2001 | Millard et al. |
| 6,225,904 B1 | 5/2001 | Jaffe et al. |
| 6,293,609 B1 | 9/2001 | Xu et al. |
| 6,324,788 B1 | 12/2001 | Koneval et al. |
| 6,328,243 B1 | 12/2001 | Yamamoto |
| 6,490,832 B1 | 12/2002 | Fischbach et al. |
| 6,525,659 B2 | 2/2003 | Jaffe et al. |
| 6,591,552 B1 | 7/2003 | Rasmussen |
| 6,598,931 B2 | 7/2003 | Tamura |
| 6,691,464 B2 | 2/2004 | Nestell et al. |
| 6,742,819 B2 | 6/2004 | So et al. |
| 6,766,617 B2 | 7/2004 | Purcell |
| 6,955,009 B2 | 10/2005 | Rasmussen |
| 7,003,916 B2 | 2/2006 | Nestell et al. |
| 7,010,883 B2 | 3/2006 | Jaerpsten et al. |
| 7,051,478 B2 | 5/2006 | Bourque et al. |
| 7,073,293 B2 * | 7/2006 | Galer .................... 49/413 |
| 7,155,862 B2 * | 1/2007 | Bourque et al. .................... 49/413 |
| 7,155,863 B2 | 1/2007 | Daniel et al. |
| 7,184,190 B2 | 2/2007 | McCabe et al. |
| 7,186,118 B2 | 3/2007 | Hansen et al. |
| 7,219,470 B2 | 5/2007 | Lahnala |
| 7,255,451 B2 | 8/2007 | McCabe et al. |
| 7,259,359 B2 | 8/2007 | Davey et al. |
| 7,395,631 B2 | 7/2008 | Lahnala |
| 7,400,435 B2 | 7/2008 | Byers et al. |
| 7,608,949 B2 | 10/2009 | Busch |
| 7,626,749 B2 | 12/2009 | Baur et al. |
| 7,871,272 B2 | 1/2011 | Firman et al. |
| 7,900,863 B1 | 3/2011 | Cheng |
| 7,934,342 B2 | 5/2011 | Lahnala |
| 7,963,070 B2 | 6/2011 | Recker |
| 8,042,664 B2 | 10/2011 | Rutkowski et al. |
| 8,069,615 B2 | 12/2011 | Heiman et al. |
| 8,127,498 B2 | 3/2012 | Lahnala |
| 8,151,519 B2 | 4/2012 | Bello et al. |
| 8,250,812 B2 | 8/2012 | Hebert et al. |
| 8,272,168 B2 | 9/2012 | Lahnala |
| 8,402,695 B2 | 3/2013 | Smith et al. |
| 2003/0074842 A1 | 4/2003 | Eckhardt et al. |
| 2003/0140562 A1 | 7/2003 | Staser et al. |
| 2003/0188490 A1 | 10/2003 | Kraus et al. |
| 2003/0213179 A1 | 11/2003 | Galer |
| 2004/0020131 A1 | 2/2004 | Galer et al. |
| 2004/0065017 A1 | 4/2004 | Priest et al. |
| 2004/0065018 A1 | 4/2004 | Reginier et al. |
| 2004/0098919 A1 * | 5/2004 | Bourque et al. .................... 49/413 |
| 2006/0032140 A1 | 2/2006 | Arimoto et al. |
| 2006/0061008 A1 | 3/2006 | Karner et al. |
| 2006/0107600 A1 | 5/2006 | Nestell et al. |
| 2006/0130405 A1 | 6/2006 | Hemond et al. |
| 2007/0209283 A1 | 9/2007 | Ostrowski et al. |
| 2007/0277443 A1 | 12/2007 | Dery et al. |
| 2008/0122262 A1 | 5/2008 | Cicala |
| 2008/0127563 A1 | 6/2008 | Tooker |
| 2008/0155902 A1 | 7/2008 | Kaiser |
| 2008/0202032 A1 | 8/2008 | Loidolt |
| 2009/0217595 A1 * | 9/2009 | Grimm et al. .................... 49/413 |
| 2009/0322705 A1 | 12/2009 | Halsey, IV |
| 2010/0122497 A1 * | 5/2010 | Lahnala .................... 49/413 |
| 2010/0146859 A1 | 6/2010 | Gipson et al. |
| 2010/0154312 A1 | 6/2010 | Gipson et al. |
| 2010/0182143 A1 | 7/2010 | Lynam |
| 2010/0240229 A1 | 9/2010 | Firman et al. |
| 2010/0263290 A1 * | 10/2010 | Pawloski et al. .................... 49/413 |
| 2010/0263291 A1 * | 10/2010 | Bello et al. .................... 49/413 |
| 2011/0030276 A1 | 2/2011 | Smith et al. |
| 2012/0091113 A1 * | 4/2012 | Bennett et al. .................... 219/203 |
| 2012/0091114 A1 | 4/2012 | Ackerman et al. |
| 2012/0117880 A1 | 5/2012 | Lahnala et al. |

(56) References Cited

U.S. PATENT DOCUMENTS

| | | |
|---|---|---|
| 2012/0139289 A1 | 6/2012 | Lahnala |
| 2013/0174488 A1 | 7/2013 | Snider et al. |
| 2013/0255156 A1 | 10/2013 | Snider |
| 2014/0047772 A1 | 2/2014 | Hulst |

* cited by examiner

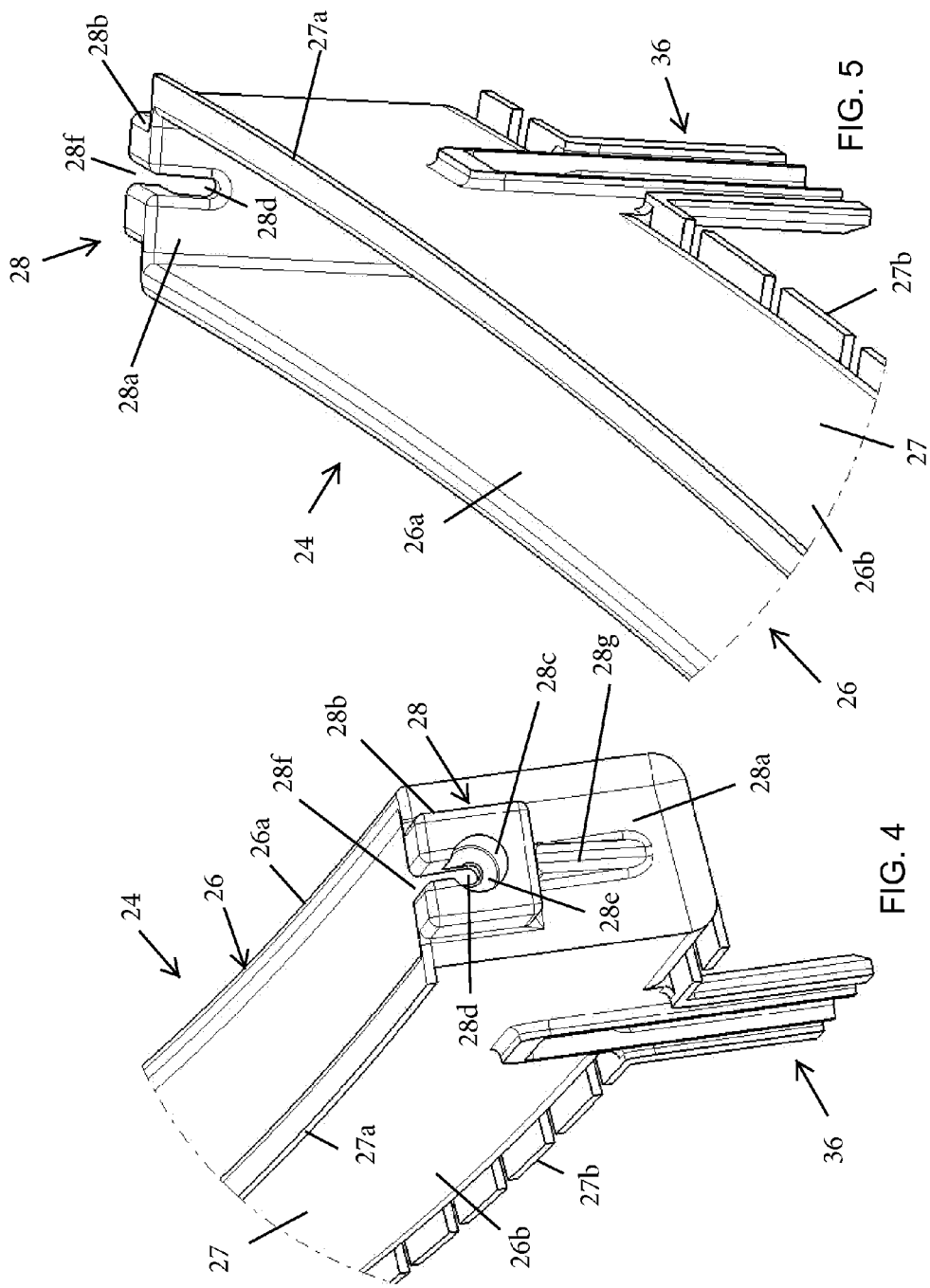

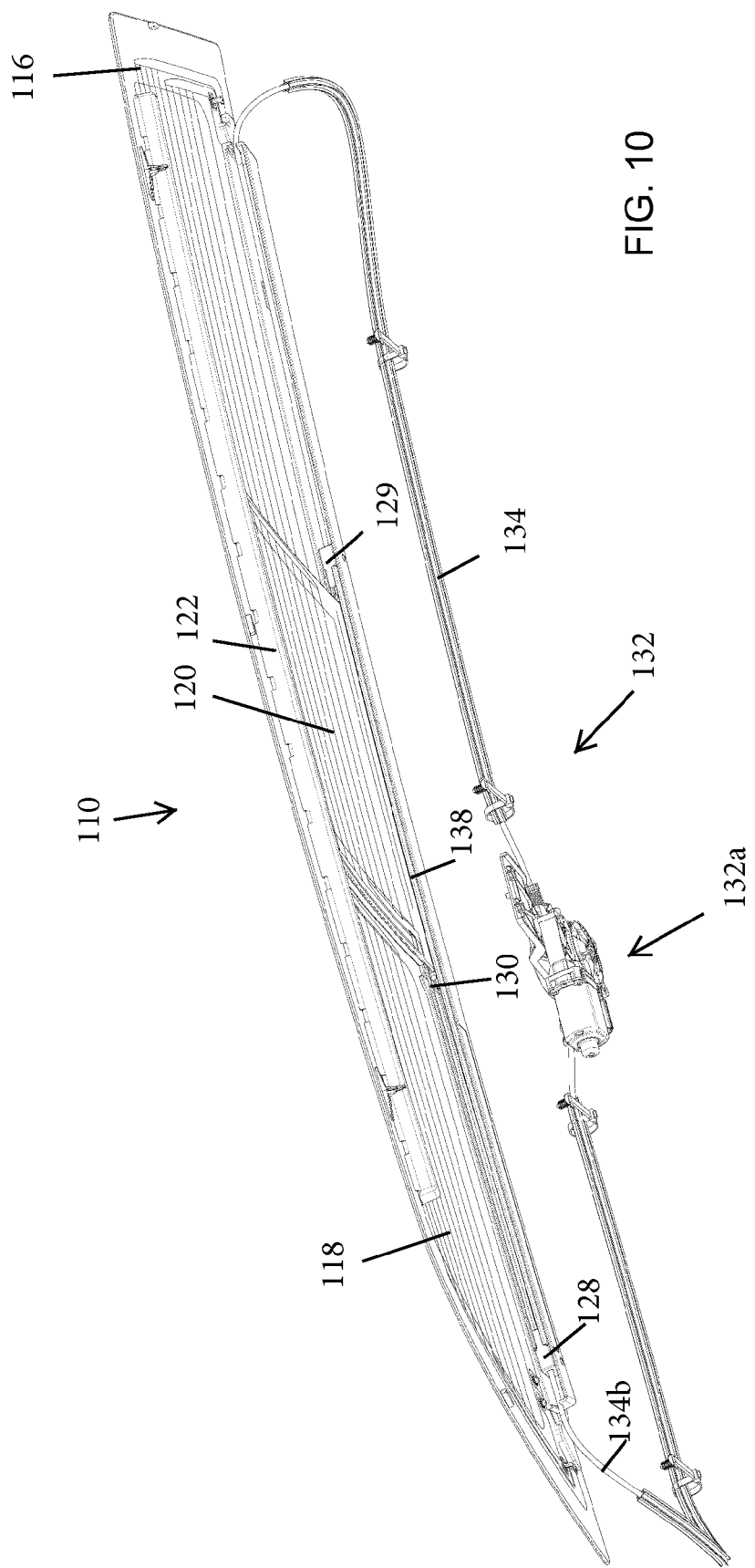

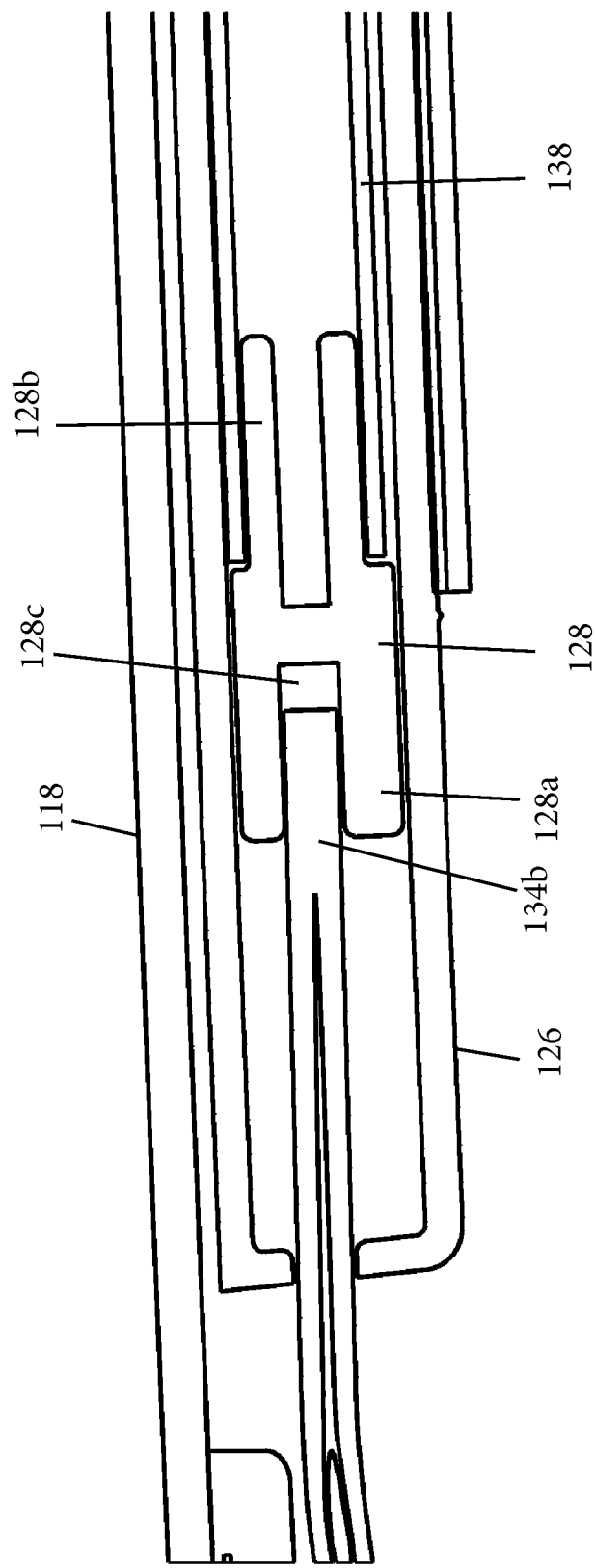

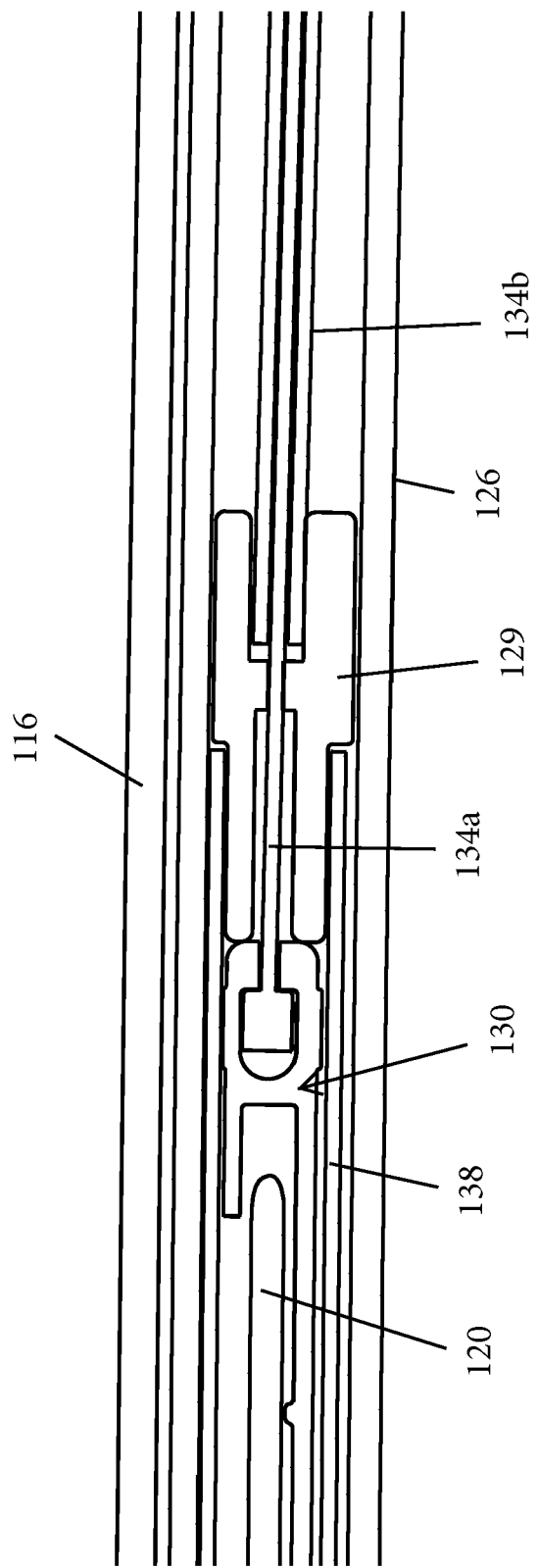

SLIDER WINDOW ASSEMBLY WITH CABLE GUIDES

CROSS REFERENCE TO RELATED APPLICATIONS

The present application claims the filing benefit of U.S. provisional applications, Ser. No. 61/738,094, filed Dec. 17, 2012, and Ser. No. 61/645,962, filed May 11, 2012, which are hereby incorporated herein by reference in their entireties.

FIELD OF THE INVENTION

The present invention relates to a slider window assembly for a vehicle and, more particularly, a rear slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. The slidable window panel may be driven or moved by a cable drive system, with a cable sheath received at end caps that are attached at end surfaces of a generally U-shaped guide rail, such as described in U.S. Pat. No. 8,151,519, which is hereby incorporated herein by reference in its entirety. Such end caps are attached to and located partially within the respective ends of the generally U-shaped guide rail, with the end caps each including an abutment flange that engages the end surface of the generally U-shaped guide rail when the end cap is fixedly attached at the end of the rail.

SUMMARY OF THE INVENTION

The present invention provides a rear slider window assembly that has a unitarily formed lower channel, with the ends of the channel having a cable sheath receiving portion integrally formed thereat. Thus, the present invention provides a single component or unitary lower channel or guide rail, without additional end caps and the like attached thereto. The window assembly includes a carrier of a movable window panel that is received in and moved along the lower channel via operation of a powered window drive system, which imparts movement of the carrier and movable window along the lower channel between its opened and closed positions via moving or pulling at a drive cable attached at either end of the carrier, with a sheath of the cable engaged at the ends of the channel.

According to an aspect of the present invention, a rear slider window assembly of a vehicle (such as a pickup truck or the like) includes a frame portion having an upper rail and a lower rail. First and second spaced apart fixed window panels are fixed relative to the frame portion and define or establish an opening therebetween. A movable window panel is movable along the upper and lower rails and is movable between a closed position, where the movable window panel is disposed at the opening, and an opened position, where the movable window panel is disposed at least partially along the first fixed window panel. The lower rail comprises a unitarily formed rail having an elongated generally U-shaped channel portion with cable guides or holders integrally formed or established at or near the ends thereof. The channel portion extends at least partially along the first and second fixed window panels and the opening. A carrier is established at a lower portion of the movable window panel and is configured to be received in, be supported by and to move along the lower rail. The cable guides are configured to engage or receive a respective sheath of a cable assembly of a powered window drive system or cable drive system, with a cable or wire of the cable assembly being attached at the respective end of the carrier, whereby pulling at either cable or wire imparts a movement of the carrier along the lower rail and between its opened and closed positions.

According to another aspect of the present invention, a slider window assembly for a vehicle includes a frame portion having an upper rail and a lower rail, and at least one fixed window panel that is fixed relative to said frame portion, with the at least one fixed window panel defining an opening. A movable window panel is movable along the upper rail and the lower rail between a closed position and an opened position, and a carrier is established at a lower portion of the movable window panel. The lower rail comprises a channel portion that extends at least partially along the at least one fixed window panel, and a guide element is disposed at least partially along the channel portion and configured to receive the carrier therein. The carrier is configured to move along the guide element in the channel portion of the lower rail. A pair of cable guides are disposed in the channel portion and at respective ends of the guide element, and the cable guides, when secured relative to said channel portion, engage respective ends of the guide element to retain the guide element in the channel portion. The cable guides are configured to engage or receive a respective sheath of a cable assembly of a cable drive system, with a cable of the cable assembly being attached at the respective end of the carrier, whereby pulling at the cable imparts a movement of the carrier along the lower rail.

Therefore, the present invention provides a unitarily formed lower rail of a slider window assembly of a vehicle, with the unitarily formed lower rail having an elongated channel portion and cable guides integrally established or formed (such as via a single molding operation or injection molding operation) at or near the end regions of the channel portion. Thus, the present invention provides a lower rail of a slider window assembly that obviates the need for separate end caps that are attached at end surfaces of a generally U-shaped guide rail, and thus provides an enhanced unitary lower rail for a slider window assembly of a vehicle, such as a rear slider window assembly of a pickup truck or the like. Optionally, the present invention provides end cable guides that attach at the channel portion and function to hold the cables and to engage the guide element to retain the respective ends of the guide element in the channel portion.

These and other objects, advantages, purposes and features of the present invention will become apparent upon review of the following specification in conjunction with the drawings.

BRIEF DESCRIPTION OF THE DRAWINGS

FIG. 4 is an enlarged perspective view of an end region of the lower channel element of FIG. 3;

FIG. 5 is another enlarged perspective view of the end region of the lower channel element of FIG. 4;

FIGS. 8-10 are perspective views of another rear slider window assembly in accordance with the present invention;

FIG. 14C is a sectional view taken along the line C-C in FIG. 12;

FIG. 14G is a sectional view taken along the line G-G in FIG. 12; and

DESCRIPTION OF THE PREFERRED EMBODIMENTS

Figure 1:
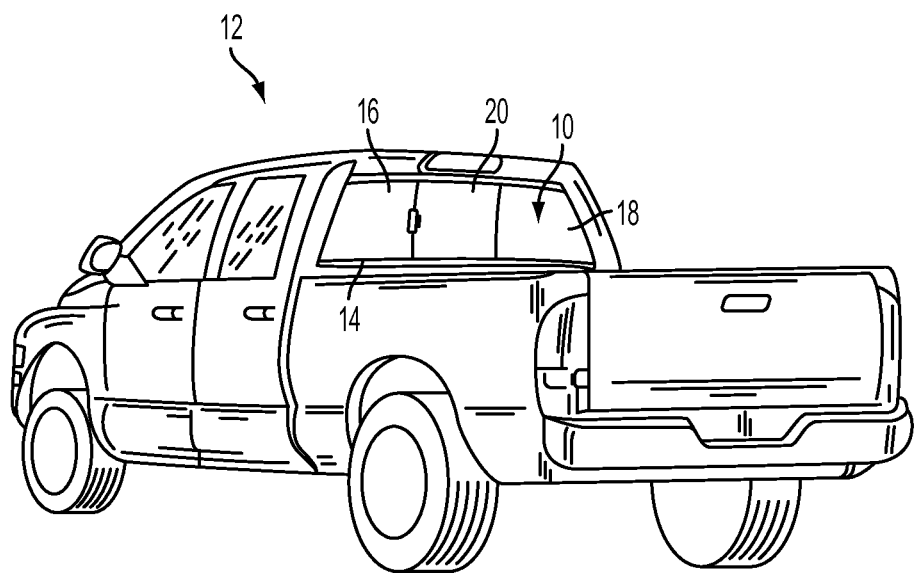
FIG. 1 is a rear perspective view of a pickup truck having a rear slider window assembly in accordance with the present invention.
Figure 2:
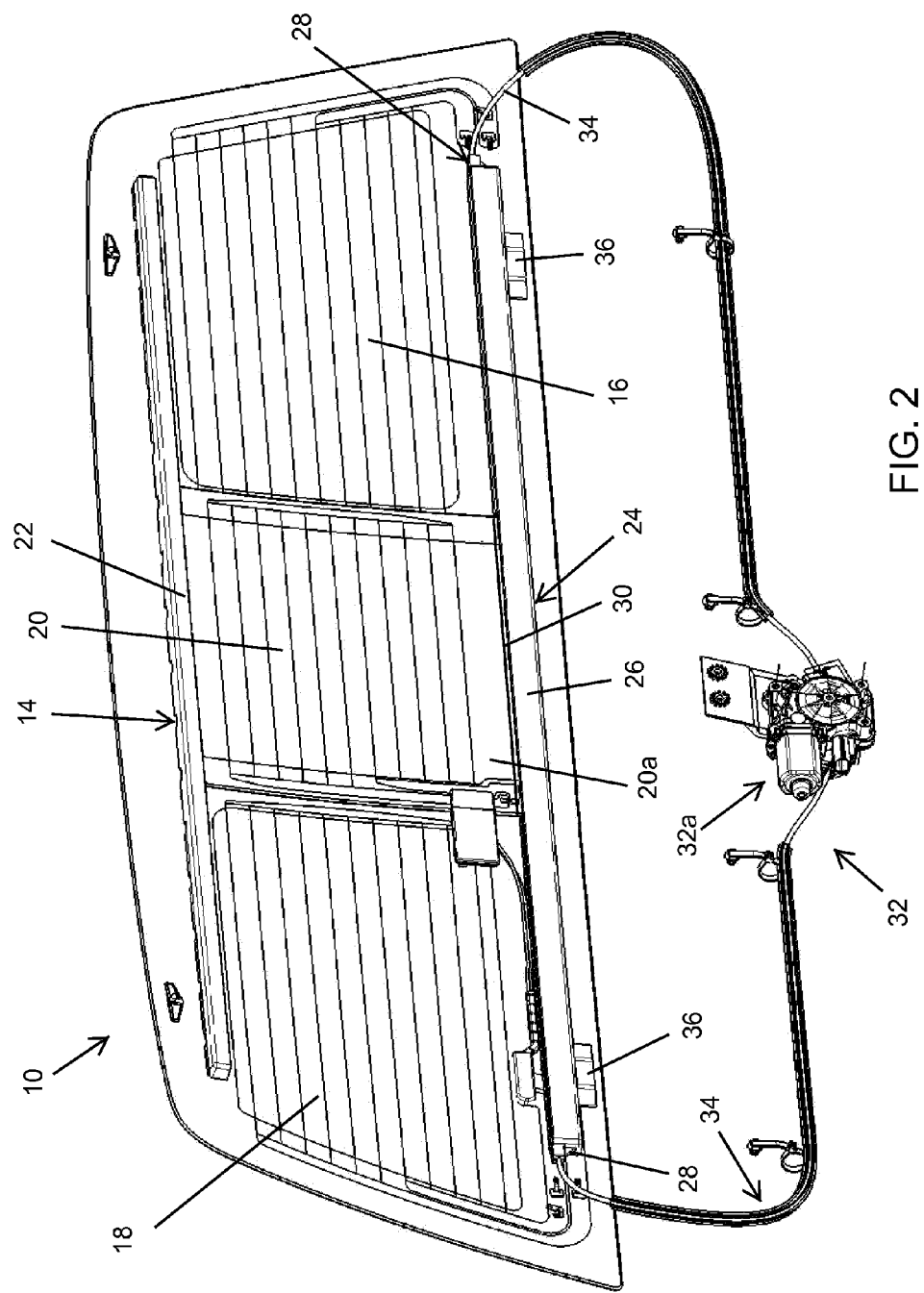
FIG. 2 is a perspective view of the rear slider window assembly of the present invention, as viewed from the forward or interior side of the window assembly when the window assembly is normally mounted to a vehicle.

Referring now to the drawings and the illustrative embodiments depicted therein, a rear slider window assembly 10 of a vehicle 12 (such as a pickup truck or the like) includes a window frame 14, a pair of side fixed window panels 16, 18 and a movable window panel 20 that is movable relative to frame 14 and fixed window panels 16, 18 between an opened position and a closed position (FIGS. 1 and 2). Frame 14 comprises an upper rail 22 and a lower rail 24, with the upper and lower edge regions of movable window panel 20 movably or slidably received in and along the respective upper and lower rails 22, 24. Lower rail 24 comprises an elongated generally U-shaped channel portion 26 disposed generally horizontally along the rear slider window and spanning at least part of each of the fixed window panels 16, 18, with cable guides or guide portions 28 unitarily formed with channel portion 26 at or near opposite end regions thereof. The lower edge region 20a of the movable window panel 20 is received in or attached to a carrier 30, which is movably received in channel portion 26 of lower rail 24 and is movable or slidable along channel portion 26 as the movable window panel 20 is moved between its opened and closed positions, as discussed below.

In the illustrated embodiment, window assembly 10 includes two fixed window panels or panel portions 16, 18 that are spaced apart so as to define an opening therebetween. As shown in FIG. 2, the window assembly may comprise a hole-in-glass window configuration, where a single fixed glass panel has an aperture or hole or opening established therethrough to define separate spaced apart fixed window panels or panel portions, such as in a similar manner as the window assemblies described in PCT Application No. PCT/US2011/051506, filed Sep. 13, 2011 and published on Mar. 22, 2012, under number WO2012/037190, which is hereby incorporated herein by reference in its entirety. Optionally, the fixed window panels may comprise two separate spaced apart fixed window panels that define the opening therebetween (and with upper and lower appliqués or trim or filler panels or elements disposed at the upper and lower regions of the opening and between the fixed window panels), while remaining within the spirit and scope of the present invention.

Upper rail 22 may comprise any suitable channel or rail element configured to slidably receive an upper edge portion of the movable window panel, and upper rail 22 may comprise a unitarily formed upper rail or channel. Optionally, the drive motor assembly may utilize aspects of the drive assemblies of the types described in U.S. Pat. Nos. 4,920,698; 4,995,195; 5,146,712; 5,531,046; 5,572,376; 6,955,009; and/or 7,073,293, and/or U.S. patent application Ser. No. 10/454,040, filed Jun. 4, 2003, published Feb. 5, 2004 as U.S. Publication No. 2004-0020131; and/or Ser. No. 11/948,094, filed Nov. 30, 2007, published Jun. 5, 2008 as U.S. Publication No. 2008-0127563, which are all hereby incorporated herein by reference in their entireties.

Slider or movable window panel 20 is movable along lower rail 24 and upper rail 22 of frame portion 14 to open and close the aperture or opening, such as in a manner similar to known slider window assemblies. Slider window panel 20 is disposed at lower carrier 30, which may receive the lower perimeter edge region 20a of the slider window panel 20 therein and is slidably or movably received in the channel portion 26 of the lower rail 24 of frame portion 14. The movable or slider window panel 20 is movable such as via manual pushing or pulling at the window panel and/or in response to actuation of a drive motor 32a of a drive motor assembly or system 32, which may move cables or wires 34a of cable assemblies 34 relative to a sheath 34b of the cable assemblies 34 or the like to impart horizontal movement of the slider window panel 20 along the rails 22, 24. As discussed below, the cable sheath and cable or wire are routed through and/or retained at the cable guides 28 that are integrally formed or established at the end regions of the channel portion 26 of the lower rail 24.

Figure 3:
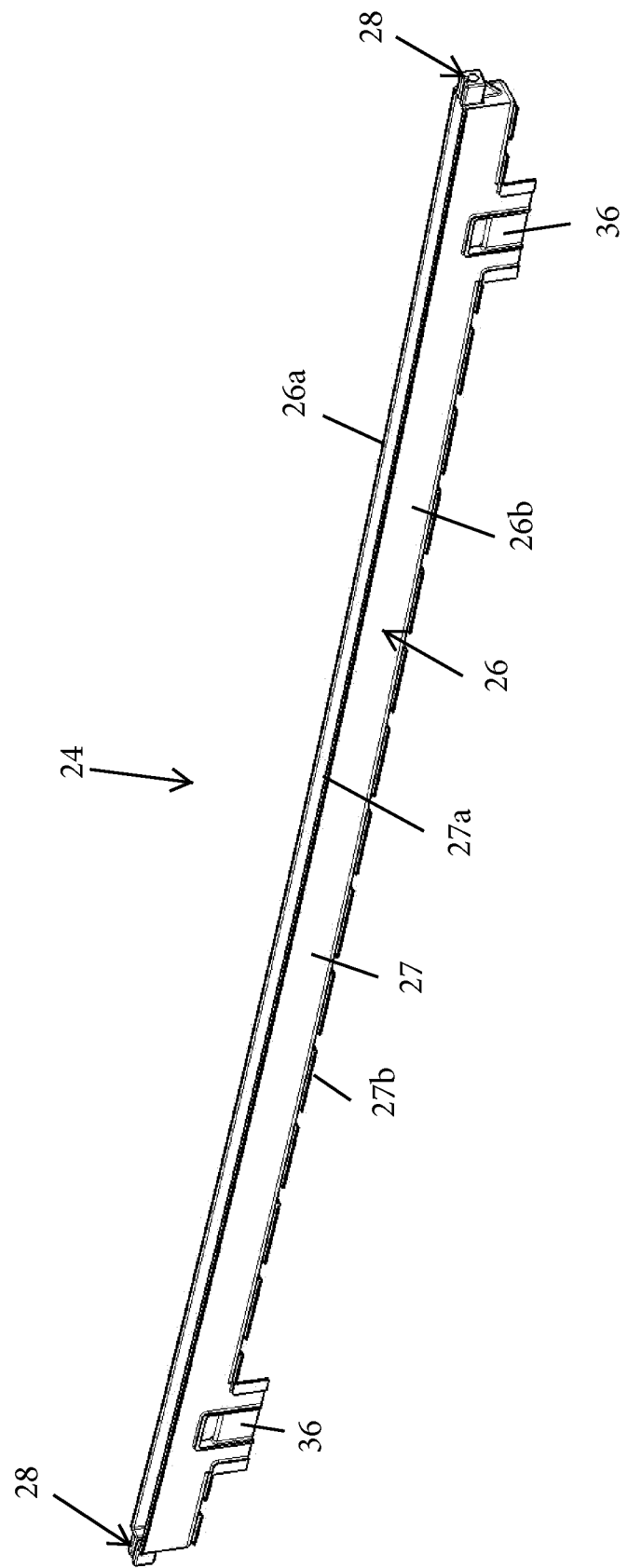
FIG. 3 is a perspective view of a lower channel element of the rear slider window assembly of FIG. 2.

In the illustrated embodiment, lower rail 24 comprises a unitarily formed (such as via molding or injection molding or the like) rail having a generally U-shaped channel portion 26 that is arranged generally horizontally across the rear slider window assembly. Lower rail 24 may be formed via any suitable forming means and may comprise any suitable material or materials. For example, lower rail 24 may comprise a rigid or substantially rigid molded polymeric channel (such as a polyvinylchloride material or PC-ABS or the like), and preferably a rigid polymeric material or engineered plastic material. As shown in FIGS. 3-5, the channel portion 26 is an elongated generally U-shaped channel having a base or lower wall and a pair of spaced apart generally vertical walls 26a, 26b extending upwardly from the base or lower wall. The cable guides 28 are integrally formed at the opposite ends of the channel portion 26 and extend upwardly from the base wall and span between the spaced apart walls 26a, 26b so as to close the end regions of the channel with integrally formed cable guides or terminals.

The cable guides 28 of lower rail 24 are formed or molded with a generally planar wall 28a and a cable retaining portion 28b, which includes a cable sheath receiver or receptacle 28c and a cable or wire passageway 28d established through a terminal wall or end 28e of the cable sheath receiver 28c. The cable retaining portion 28b may be slotted so that the cable or wire may be moved into and along the slot 28f until the sheath is generally aligned with the sheath receiver 28c, whereby the sheath is received into the sheath receiver 28c and the end of the cable or wire 28 passes through the cable or wire passageway 28d, such that the cable assembly 34 and drive assembly 32 may be installed at the window assembly and connected with the carrier of the movable window panel after the window assembly is assembled, without requiring threading of the cable or wire 32b through the cable passageway 28d of lower rail 24.

Figure 6:
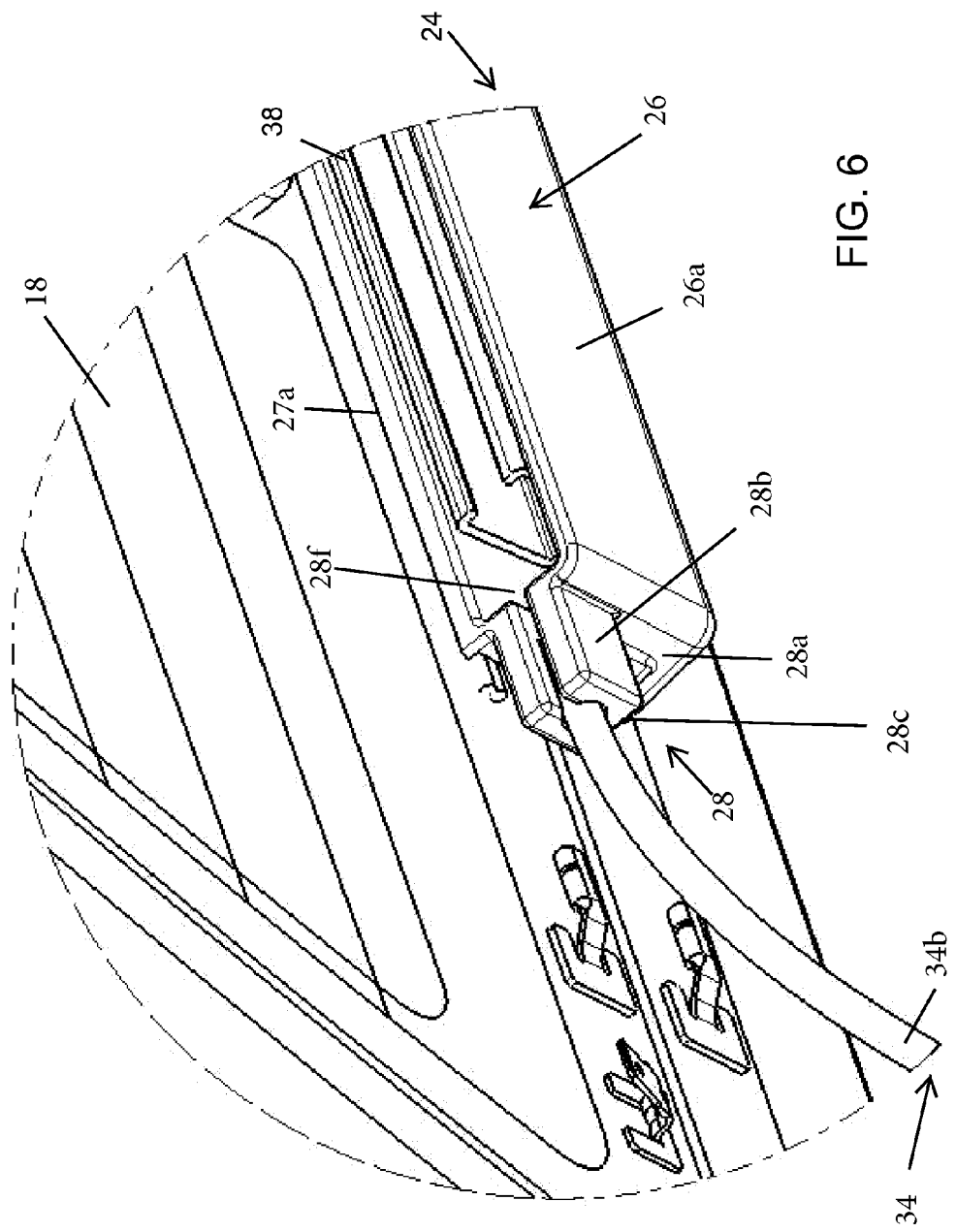
FIG. 6 is an enlarged perspective view of an end region of the lower channel element of FIG. 3, shown as attached at a lower region of the window assembly and with a cable attached thereto.
Figure 7:
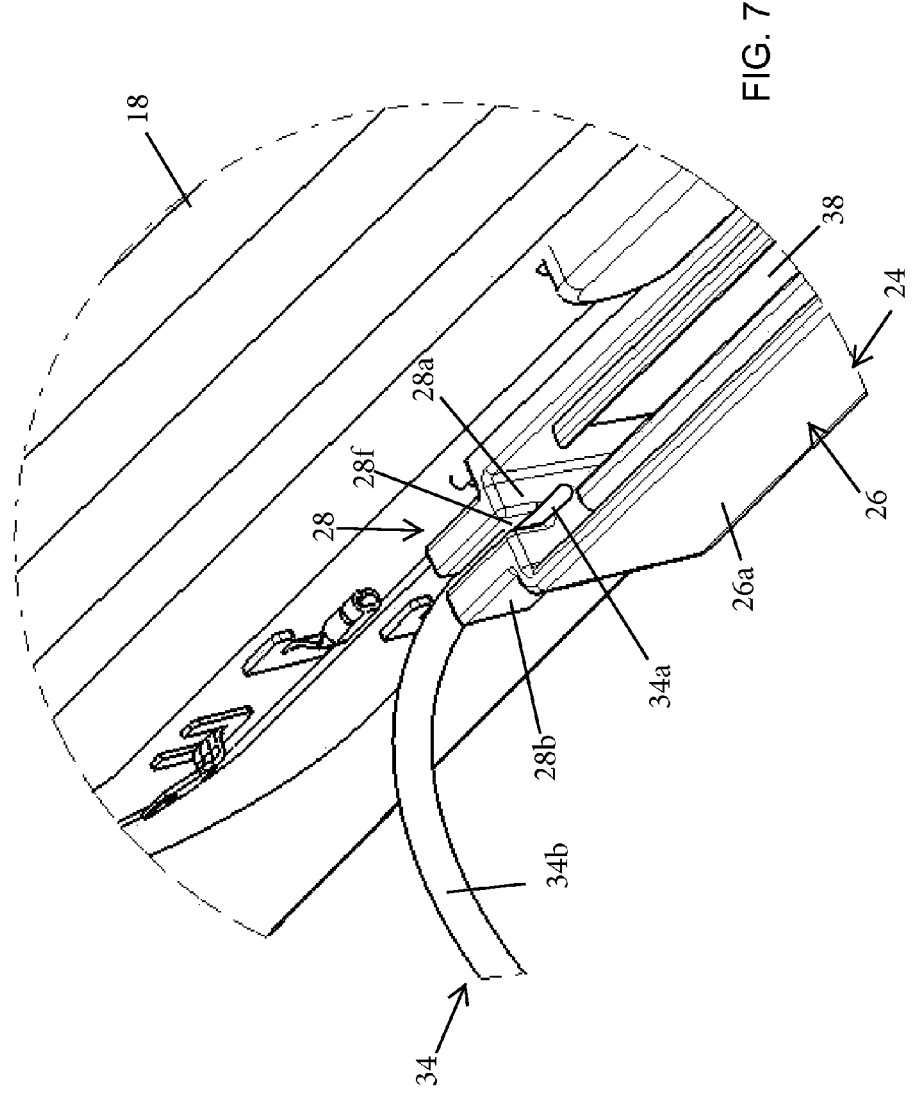
FIG. 7 is another enlarged perspective view of the end region of the lower channel element of FIG. 6.
Figure 8:
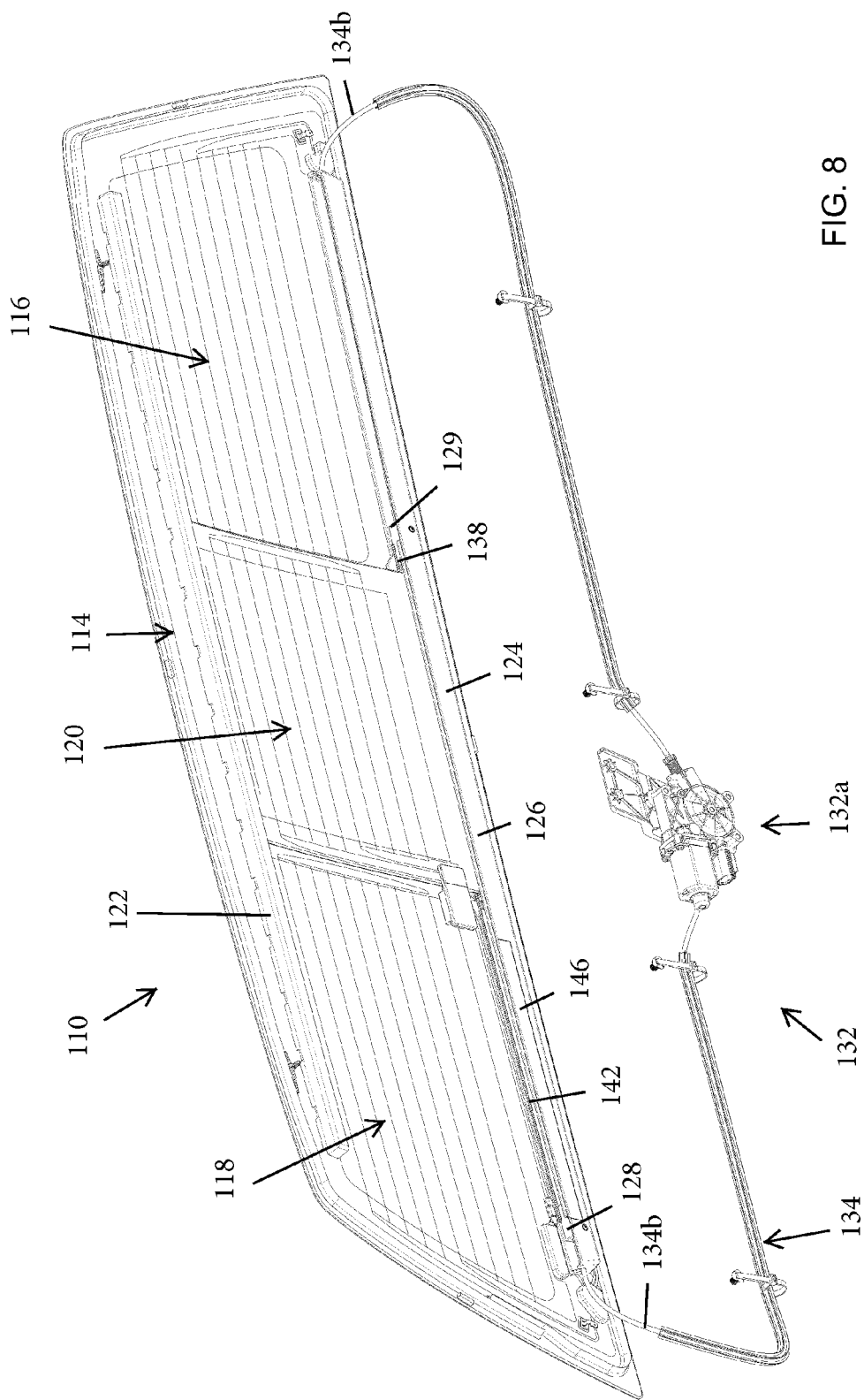
Figure 9:
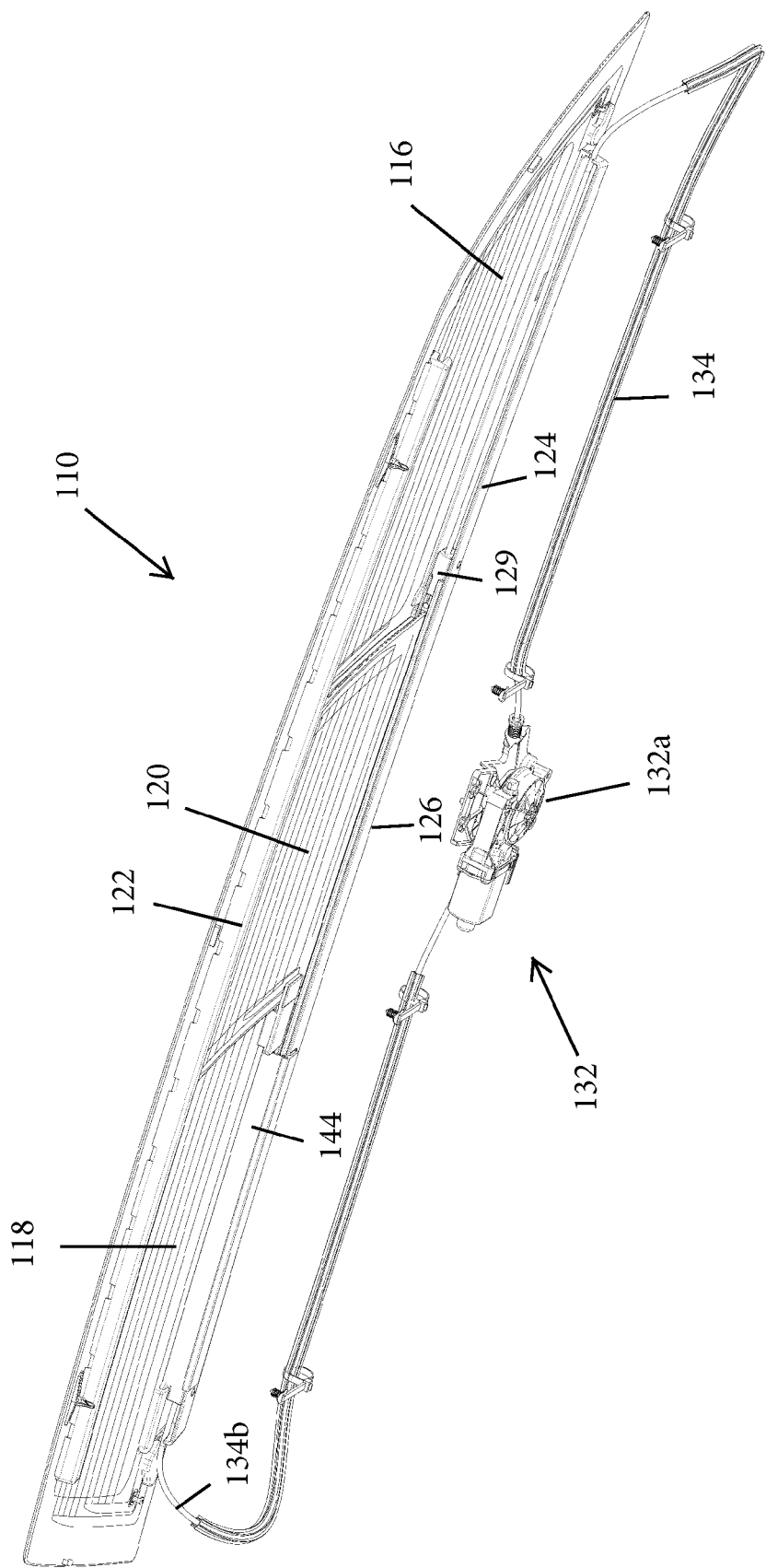

As shown in FIGS. 6 and 7, cable assembly 34 is positioned at the lower rail 24 such that the sheath 34a of the cable assembly is received in the sheath receiver 28c until the end of the cable sheath 34a seats against the cable stop wall 28e of cable retaining portion 28b of cable guide 28, whereby the cable or wire 34b passes through cable passageway 28d for connection to a respective cable guide of the carrier 30 of the movable window panel 20. A gusset or rib 28g is formed at a lower portion of the cable retaining portion 28b and outer portion of the cable guide 28 so as to provide enhanced strength and durability to the cable guides 28 and lower rail 24.

Thus, and as best shown in FIGS. 4-7, cable guides 28 of lower rail 24 are integrally or unitarily formed at or with the elongated channel portion 26 so as to provide integral cable guides at or near the end regions of the channel portion that are integrally formed with and that are continuous with the base wall and side walls 26a, 26b of the channel portion 26. Thus, the present invention provides a unitarily formed lower rail 24 of a slider window assembly 10, with the lower rail 24 having cable guides 28 integrally formed with an elongated channel portion 26 and with the cable guides 28 providing a unitary construction of a cable guide and holder for holding the cable of a cable drive system at the ends of the lower rail of the window assembly.

The unitary construction of the lower rail of the present invention thus provides enhanced assembly processes and provides part deproliferation, and obviates the need of separate end caps of the prior art (such as described in U.S. Pat. No. 8,151,519, incorporated above) that are typically attached at the ends of a separate channel via a separate manufacturing process that is separate and distinct from the forming of the prior art guide rail. As described in the prior art U.S. Pat. No. 8,151,519, the U-shaped channel or rail and the end caps or cap bodies are two separate and distinct components that are separately formed and then attached together via a separate manufacturing processes, where, during the separate assembly process, the end caps are moved into the guide rail and the abutment flanges of the end caps are moved to be in contact with an end surface of the guide rail, whereby the end caps are attached to the guide rail.

In stark contrast to the prior art guide rail and end cap assembly, the present invention provides an integrally formed lower rail having a channel portion and a sheath termination point or guide portion or cable guide. Thus, the molded or formed engineered plastic incorporates the end fixing or cable guide as an integral part of the rail itself. With the unitary lower rail of the present invention, there are no separate end caps with abutment flanges that are aligned with and positioned to be in contact with end surfaces of a guide rail. Thus, with the present invention, there are no separate manufacturing processes to abut the end cap to the end surface of a guide rail and to attach the end cap to the end of the guide rail.

The benefits of embodiments of the present invention may also be realized in sliding window constructions where an aperture is created in a fixed window panel and where a movable window panel can be made to open or close the aperture. Slider windows of this type are disclosed such as in U.S. patent application Ser. No. 10/408,047, filed Apr. 4, 2003, published Nov. 20, 2003 as U.S. Publication No. 2003-0213179, and/or such as in RE41502, and/or such as in PCT Application No. PCT/US2011/051506, filed Sep. 13, 2011 and published on Mar. 22, 2012 as International Publication No. WO2012/037190, and/or PCT Application No. PCT/US2011/066522, filed Dec. 21, 2011 and published Jun. 28, 2012 as International Publication No. WO 2012/088287, which are hereby incorporated herein by reference in their entireties. The benefits of embodiments of the present invention may also be realized in vehicular movable window assemblies other than a rear slider window assembly for a pickup truck or the like, such as (for example) a slider window assembly suitable for use as a movable side window for a vehicle such as a van or a bus.

As shown in FIG. 2, lower rail 24 extends substantially across the rear slider window assembly 10 and extends at least partially or substantially along the lower regions of both of the fixed window panels 16, 18. In the illustrated embodiment, the side wall 26b is configured to be adhesively attached at the interior surfaces of the fixed window panel or panels, and may include a channel or recess 27 with an upper spacer or flange or stand-off 27a at and along an upper region of the side wall 26b and one or more lower spacers or flanges or stand-offs 27b at and along a lower region of the side wall 26b to establish the desired spacing or depth of the recess 27 to provide a desired bondline thickness of the cured adhesive layer disposed at the recess for adhering the lower rail 24 to the window panel or panels.

The lower rail 24 thus may be adhered or bonded to the inner surface of the fixed window panel or panels, such as via an adhesive bond or adhesive layer disposed at the recessed portion 27 of the lower rail 24 or the like. A sealing element may be disposed along the inner surface of the fixed window panel and at the lower perimeter of the opening (such as via adhesive bonding of the sealing element at the inner surface of the fixed window panel, and such as at an opaque coating or frit layer disposed or established at the fixed panel around the window opening) and generally above the lower rail 24, to seal against the outer surface of the movable window panel 20 and slidingly seal against the outer window panel surface as the movable window panel is moved between its opened and closed positions. An upper sealing element may be similarly disposed at or bonded at the inner surface of the fixed glass window panel at and along the upper perimeter region of the window opening for sealing against an upper region of the movable window panel.

Optionally, and as shown in FIGS. 3-5, the channel portion 26 of lower rail 24 may include one or more water drainage conduits or elements 36 that provide one or more apertures or holes or drain-ways established at and through the side wall 26b and/or the base or lower wall to facilitate drainage of water or moisture from the channel portion 26. The water drainage element 36 may have flanges or stand-offs 36a to define adhesive channels along the water drainage passageway, so that the water drainage element 36 may be adhered to the window panel and adhesive is confined within the adhesive channel and does not flow into the water drainage passageway when the lower rail 24 is adhesively attached at the fixed window panel or panels. The water drainage elements or conduits may comprise any suitable elements, and may utilize aspects of the elements and window assemblies described in PCT Application No. PCT/US2011/051506, filed Sep. 13, 2011 and published on Mar. 22, 2012 as International Publication No. WO2012/037190, which is hereby incorporated herein by reference in its entirety. For example, the water drainage conduits 36 may be formed with or integrally formed or molded with the lower rail 24, such that a passageway is established between a portion of the lower rail 24 and the inner surface of the fixed window panel or panels when the lower rail is adhered or attached at the window panel or panels.

In the illustrated embodiment, window assembly 10 includes a guide element 38 received in and fixedly secured (such as by gluing or by mechanically securing) in channel portion 26 of lower rail 24 and extending only partially along channel portion 26, such as extending along one of the fixed window panels 16 and the opening for the movable window panel 20, and such as by utilizing aspects of the window assemblies described in PCT Application No. PCT/US2011/066522, filed Dec. 21, 2011 and published Jun. 28, 2012 as International Publication No. WO 2012/088287, which is hereby incorporated herein by reference in its entirety. Although shown and described as a horizontally movable center window that moves relative to a pair of opposite side windows (such as for applications at the rear of a cab of a pickup truck or the like), it is envisioned that the present invention is applicable to other types of movable window assemblies, such as horizontally movable window panels that move relative to a single fixed window panel and/or frames (such as for a rear or side opening of a vehicle or the like), and/or such as vertically movable window panels that move relative to one or more fixed panels and/or frames (such as for a rear or side opening of a vehicle or the like), while remaining within the spirit and scope of the present invention.

Optionally, although shown and described as a unitarily molded lower rail having a channel portion and cable guides integrally molded together via a common molding process, it is envisioned that the cable guides may be molded at the end regions of the rail via an overmolding process that overmolds a plastic or polymeric layer over a metallic channel portion, such that the cable guides are integrally formed at or near the end regions of the rail and are not separate components that abut against the end surface of the channel and that are attached thereat. Optionally, the cable guides may comprise separate components that are fully received in and seated or retained in the channel and inboard of the ends or end surfaces of the channel, such that the cable guides do not include any abutment flanges that are positioned in contact with the end surfaces of the channel.

For example, and with reference to FIGS. 8-14H, a rear slider window assembly 110 of a vehicle (such as a pickup truck or the like) includes a window frame 114, a pair of side fixed window panels 116, 118 and a movable window panel 120 that is movable relative to frame 114 and fixed window panels 116, 118 between an opened position and a closed position. Frame 114 comprises an upper rail 122 and a lower rail 124, with the upper and lower edge regions of movable window panel 120 movably or slidably received in and along the respective upper and lower rails 122, 124. Lower rail 124 comprises an elongated generally U-shaped channel portion 126 disposed generally horizontally along the rear slider window and spanning at least part of each of the fixed window panels 116, 118, with end stops or cable guides 128, 129 disposed in the channel 126 at opposite ends of a guide element 138 that receives a carrier 130 attached at a lower edge region 120a of the movable window panel 120 and that establishes the range of travel of the movable window panel 120. The carrier 130 is movably received in the guide element 138 of the channel portion 126 of lower rail 124 and is movable or slidable along the guide element 138 and channel portion 126 as the movable window panel 120 is moved between its opened and closed positions. The end stops 128, 129 function to anchor the ends of the cable sheath and to anchor or retain the ends of the guide element 138 in the channel portion 126, as discussed below. The window panels and upper rail and other components of the window assembly 110 may be similar to those of window assembly 10, discussed above, such that a detailed discussion of the window assemblies need not be repeated herein.

Slider or movable window panel 120 is movable along lower rail 124 and upper rail 122 of frame portion 114 to open and close the aperture or opening, such as in a manner similar to known slider window assemblies. Slider window panel 120 is disposed at lower carrier 130, which may receive the lower perimeter edge region 120a of the slider window panel 120 therein and is slidably or movably received in the guide element 138 at channel portion 126 of the lower rail 124 of frame portion 114. The movable or slider window panel 120 is movable such as via manual pushing or pulling at the window panel and/or in response to actuation of a drive motor 132a of a drive motor assembly or system 132, which may move cables or wires 134a of cable assemblies 134 relative to a sheath 134b of the cable assemblies 134 or the like to impart horizontal movement of the slider window panel 120 along the rails 122, 124. The cable sheath and cable or wire are routed through and/or retained at the end stops or cable guides 128, 129 that are disposed in channel portion 126 and at the ends of the guide element 138 and that are secured or fastened to the channel portion 126 to fix or retain the ends of the guide element 138 and the end stops within and relative to the channel 126.

As shown in FIGS. 3-5, the channel portion 126 is an elongated generally U-shaped channel having a base or lower wall and a pair of spaced apart generally vertical walls extending upwardly from the base or lower wall. The guide element 138 comprises an elongated element that is received within the channel and has a generally U-shaped portion that receives the carrier 130 therein. The guide element may comprise a guide element similar to those described in PCT Application No. PCT/US2011/066522, filed Dec. 21, 2011 and published Jun. 28, 2012 as International Publication No. WO 2012/088287, which is hereby incorporated herein by reference in its entirety.

Figure 11A:
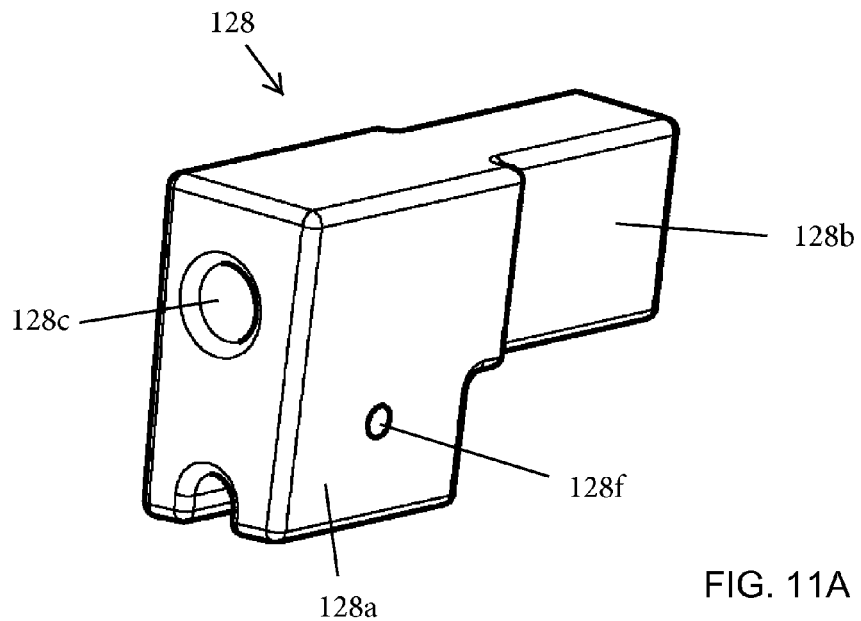
FIGS. 11A and 11B are perspective views of an end stop of the rear slider window assembly of FIGS. 8-10.
Figure 11B:
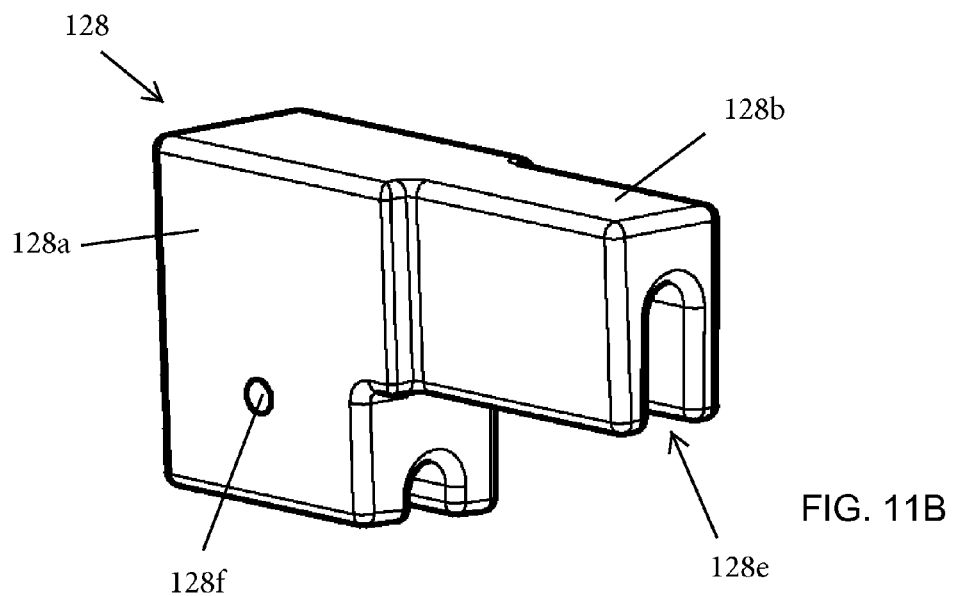
Figure 12:
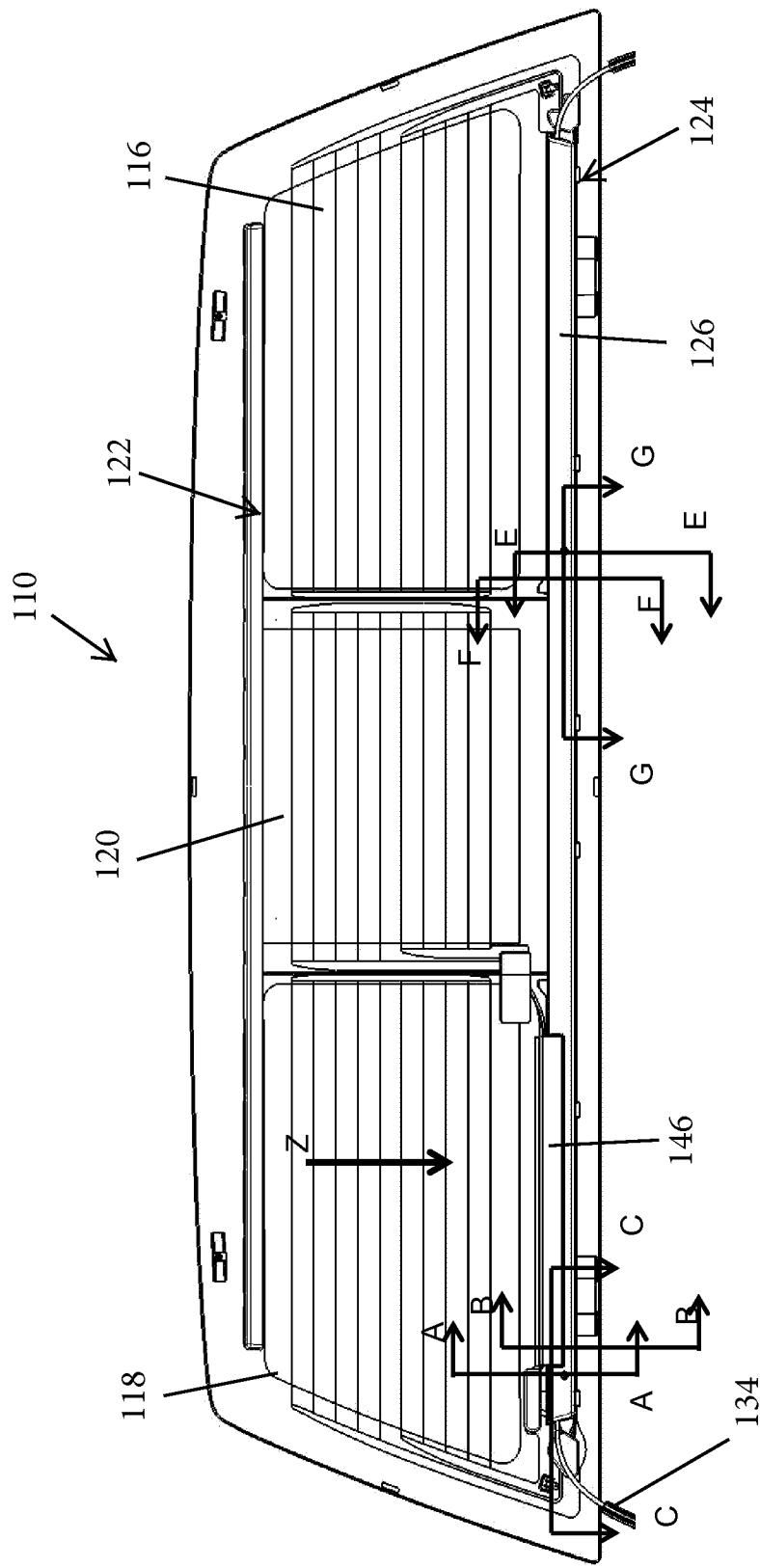
FIG. 12 is a rear elevation of the rear slider window assembly of FIGS. 8-10.
Figure 13:
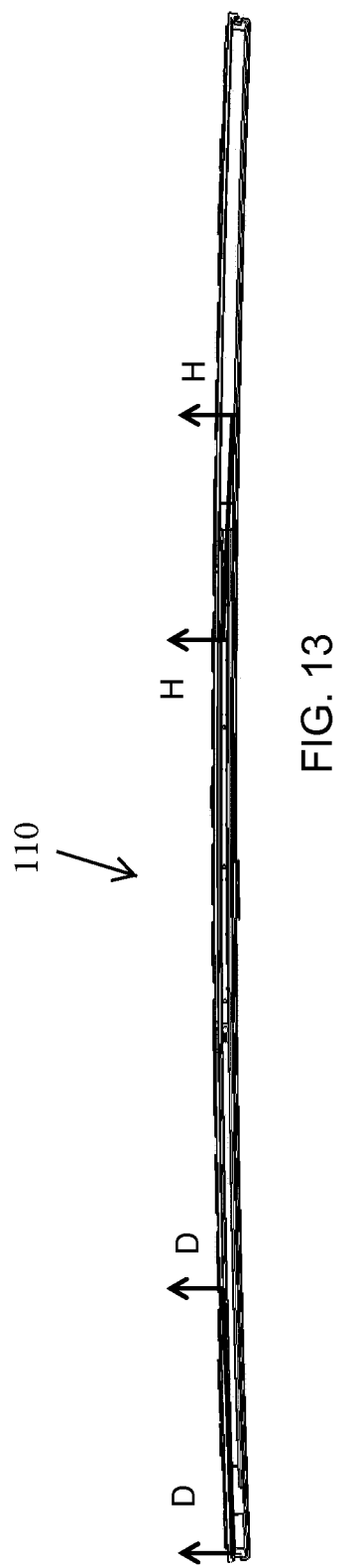
FIG. 13 is a top view of the rear slider window assembly, taken in the direction of the arrow Z in FIG. 12.
Figure 14A:
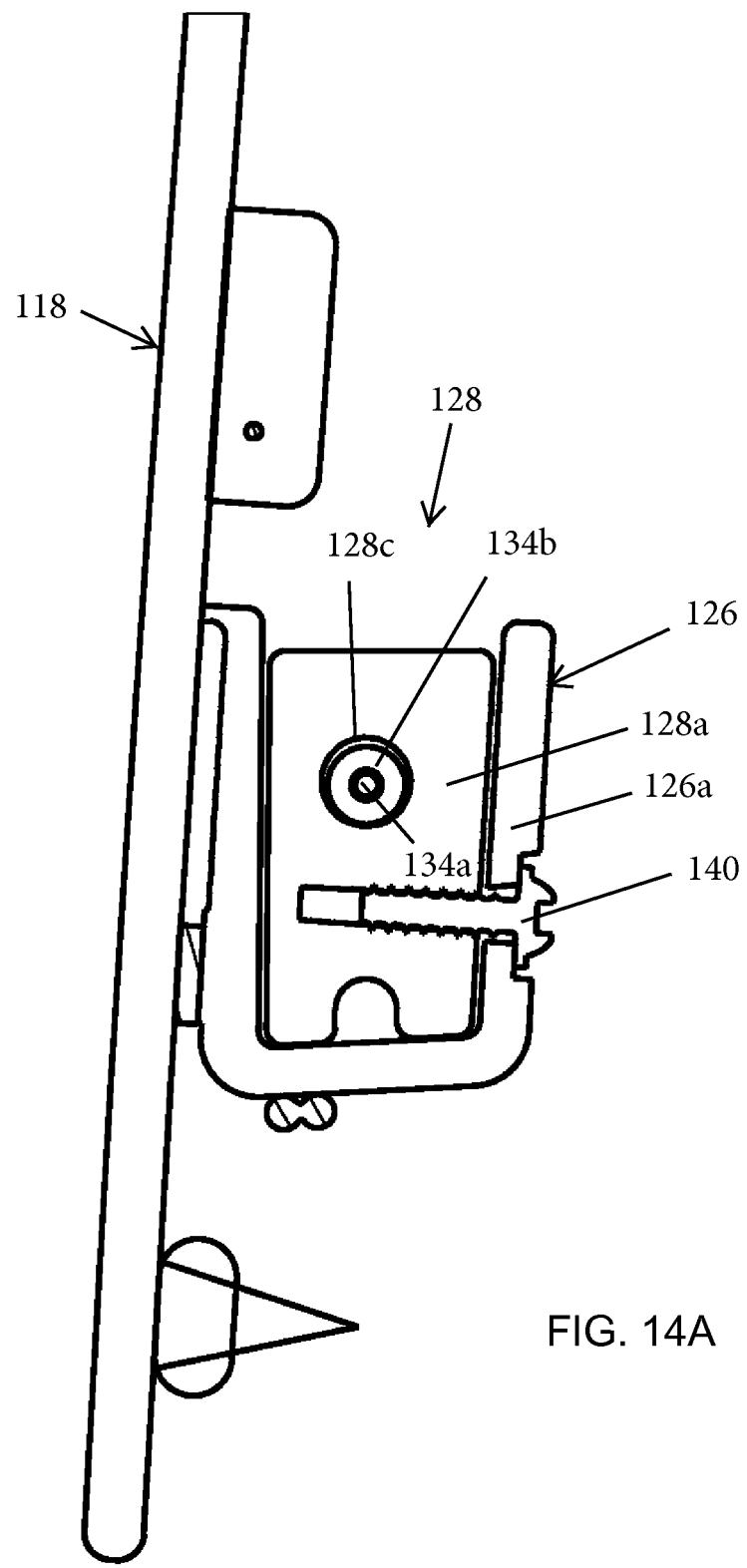
FIG. 14A is a sectional view taken along the line A-A in FIG. 12.
Figure 14B:
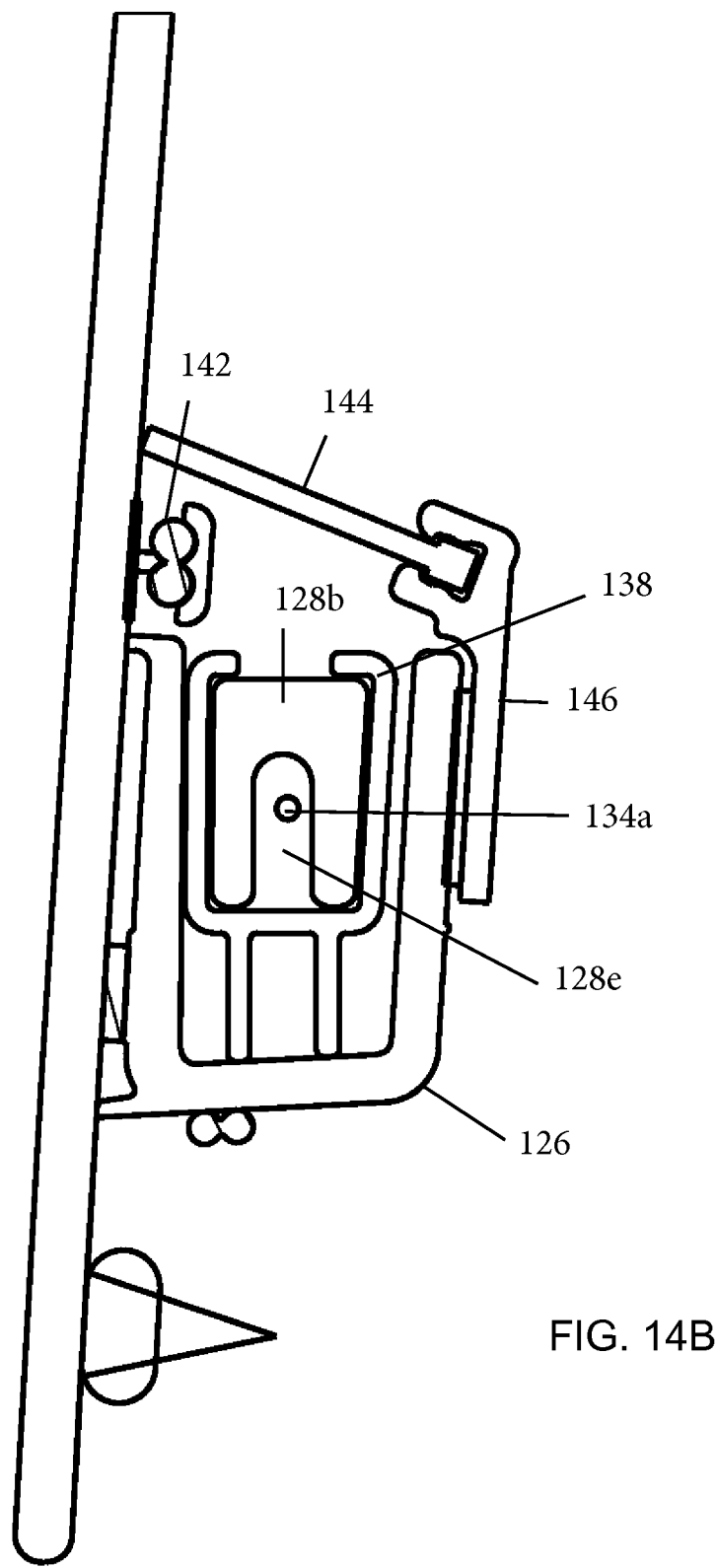
FIG. 14B is a sectional view taken along the line B-B in FIG. 12.
Figure 14D:
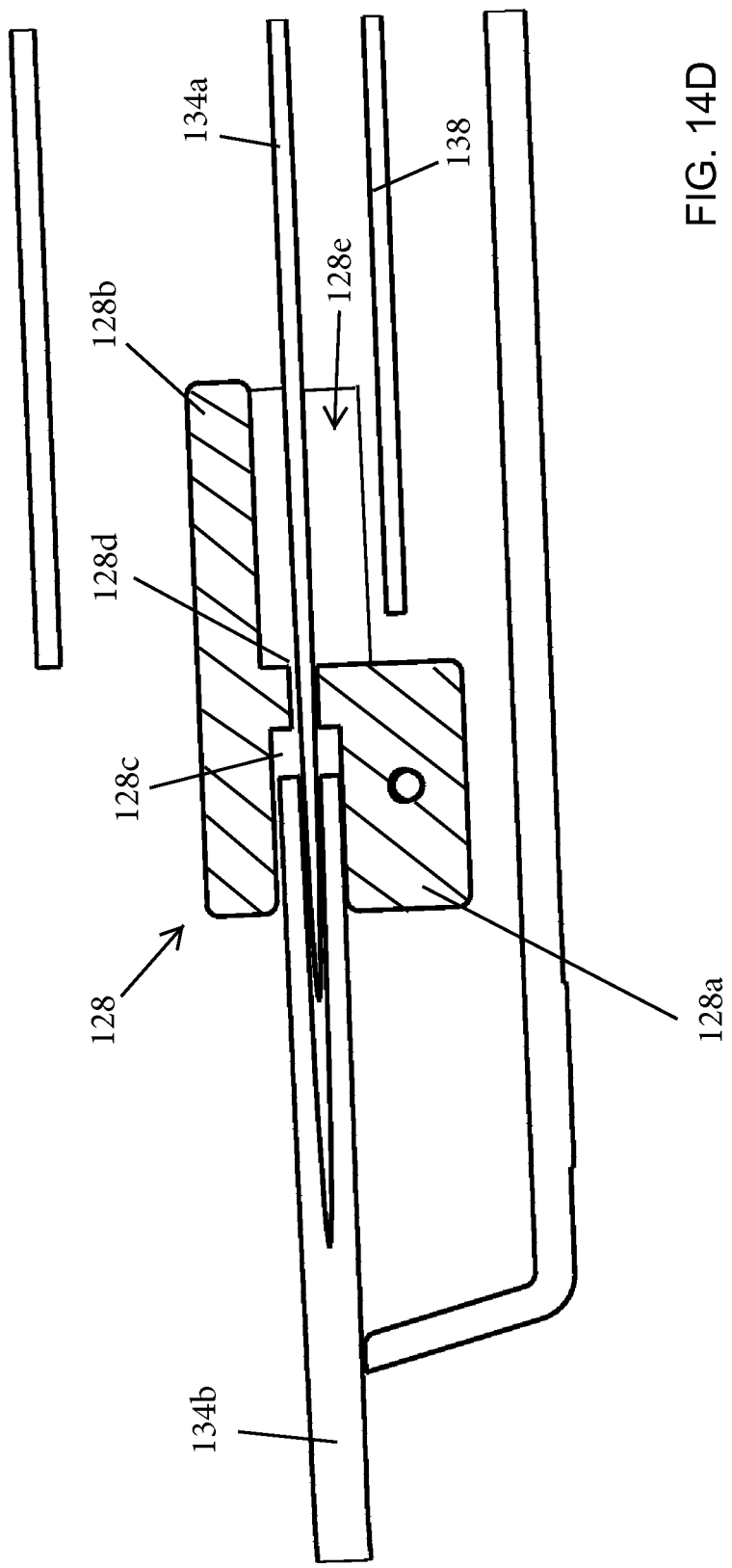
FIG. 14D is a sectional view taken along the line D-D in FIG. 13.
Figure 14E:
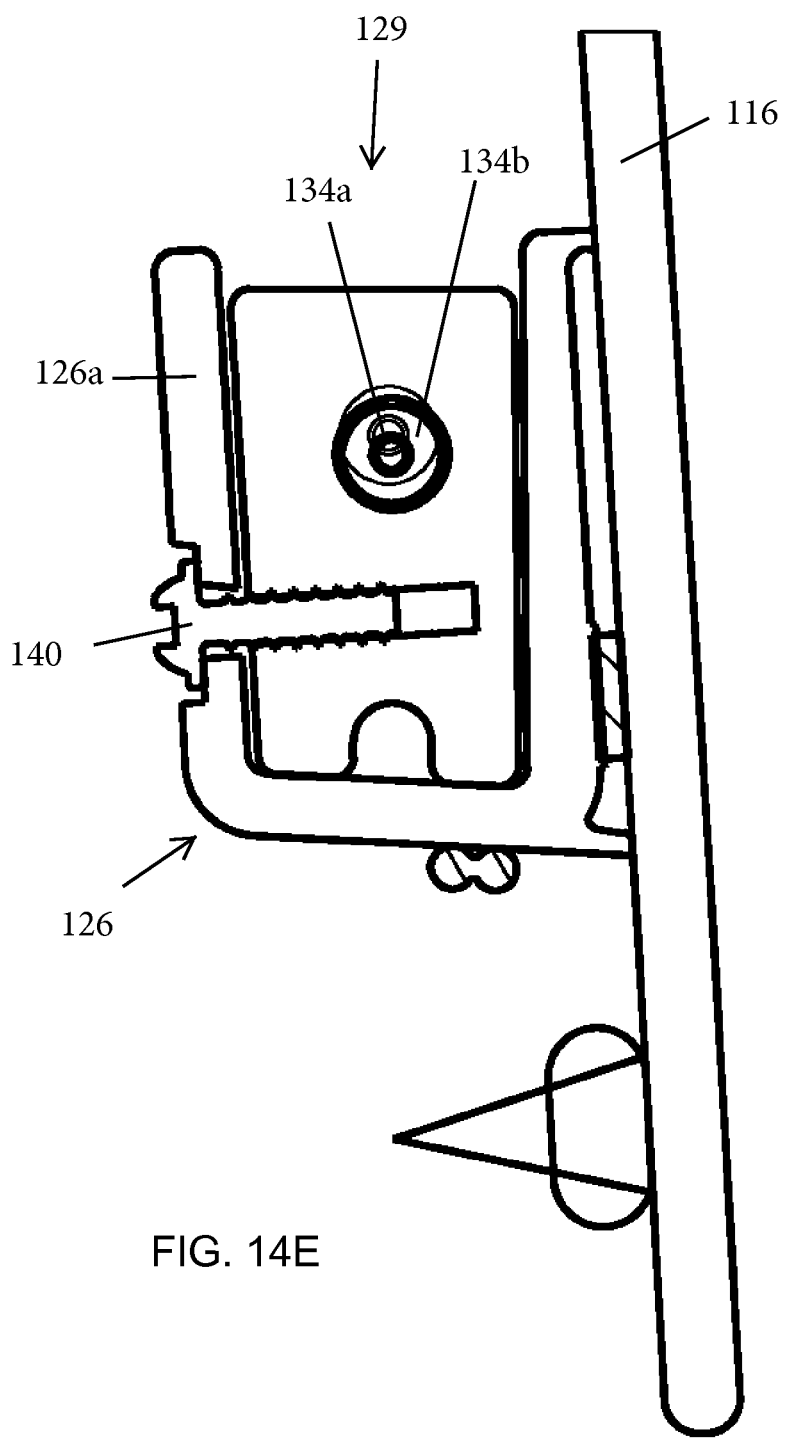
FIG. 14E is a sectional view taken along the line E-E in FIG. 12.
Figure 14F:
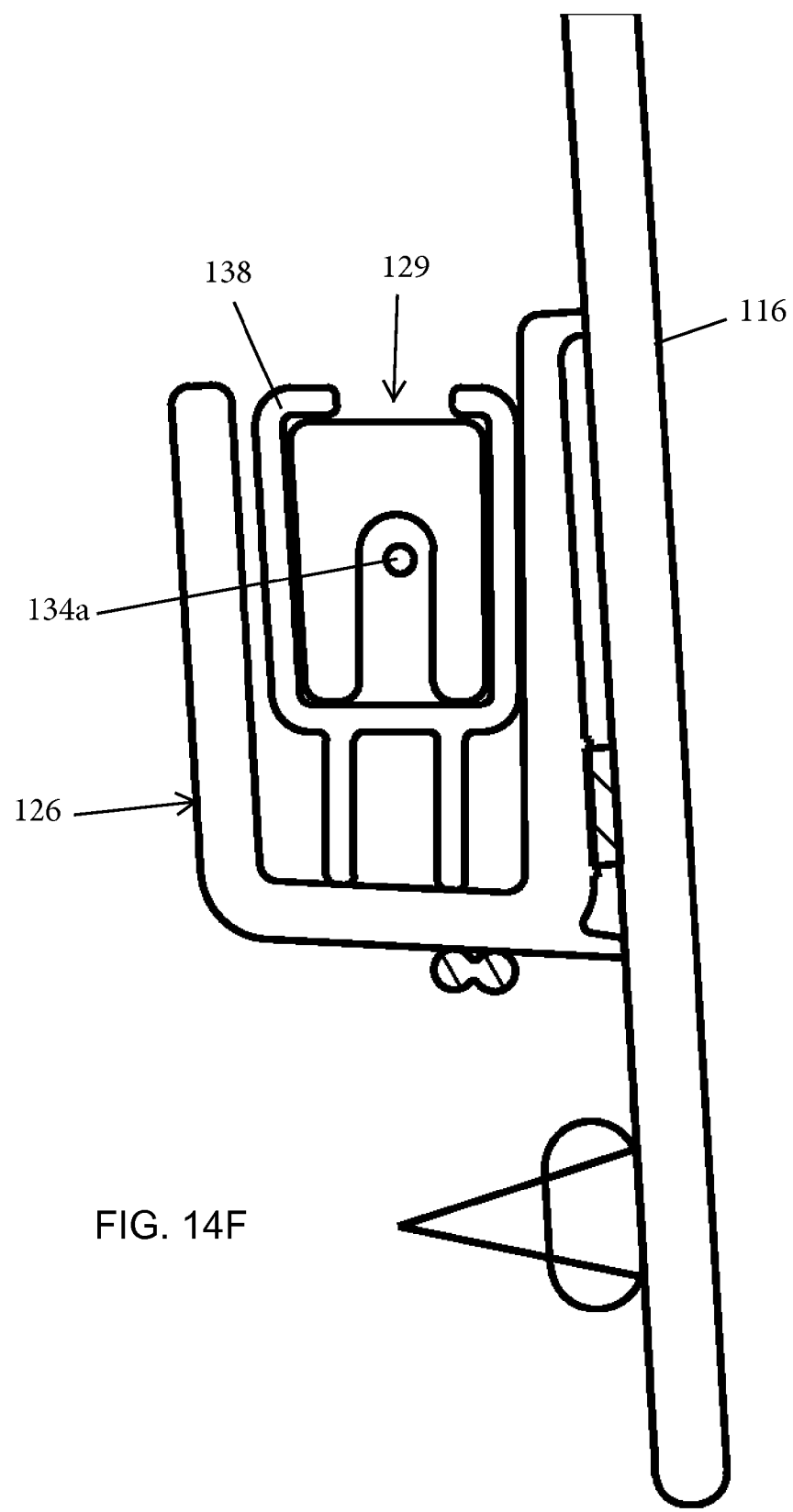
FIG. 14F is a sectional view taken along the line F-F in FIG. 12.
Figure 14H:
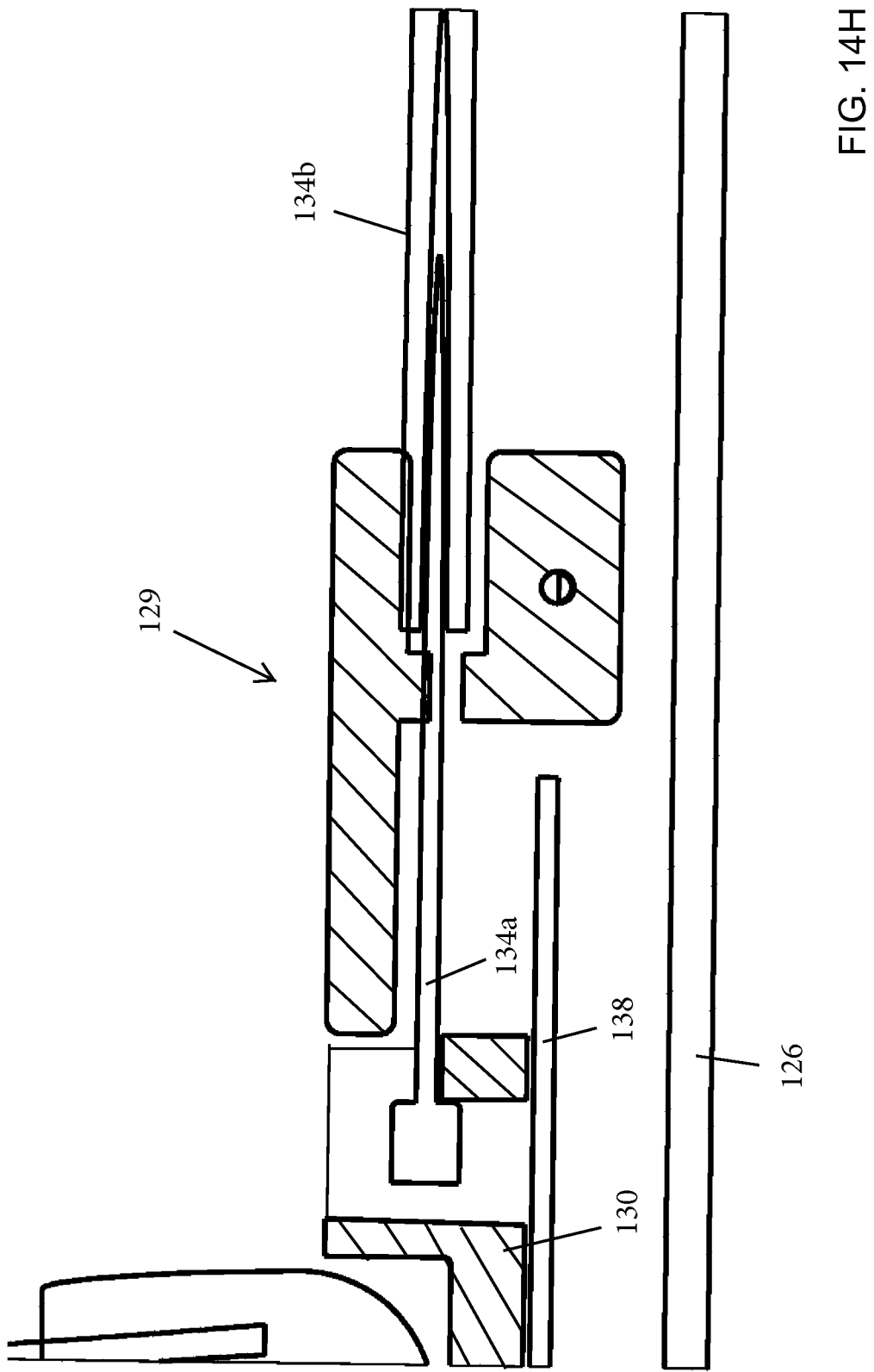
FIG. 14H is a sectional view taken along the line H-H in FIG. 13.

The end stops 128, 129 may be secured relative to the channel portion 126 via any suitable means, such as via a fastener 140 (such as shown in FIGS. 14A and 14E) that is inserted through an outer wall 126a of channel portion and into a threaded passageway 128f (FIGS. 11A and 11B) of the respective end stop 128, 129. The end stops 128, 129 are generally the same or similar in shape and construction (and may be the identical or common part merely flipped 180 degrees, with the threaded passageway optionally extending entirely through the base portion 128a), such that only one end stop 128 will be described in detail herein. As best shown in FIGS. 11A and 11B, the end stop or cable guide 128 has a base portion 128a that is sized to be received in the channel portion 126 and a guide element retaining portion 128b that protrudes from the base portion and is sized to be received in the end of the guide element 138. A cable passageway is established through the end stop and has a sheath passageway or portion 128c established partially through the base portion and a cable passageway or portion 128d established the rest of the way through the base portion (as can be seen in FIG. 14D). Thus, when assembled, the end of the cable sheath 134b is received in and seated in sheath passageway 128c and the movable cable 134a passes through cable passageway 128d and through a channel or passageway 128e of the guide element retaining portion 128b, whereby the end of the cable is connected to a respective end portion of the carrier 130 of the movable window 120. Although shown as having a cylindrical passageway through the base portion 128a, the end stop may have a slot between the passageway and its outer wall so that the cable may be inserted along and through the slot and then the sheath may be inserted into the sheath passageway, so as to avoid having to thread the cables through the passageways of the end stops.

The guide element and end stops may be assembled at the channel portion via any suitable means (such as by utilizing aspects of the window assemblies described in PCT Application No. PCT/US2011/066522, filed Dec. 21, 2011 and published Jun. 28, 2012 as International Publication No. WO 2012/088287, which is hereby incorporated herein by reference in its entirety). For example, the guide element 138 may be disposed in the channel portion 126 and positioned at the appropriate location along the channel portion, and the carrier 130 of the movable window panel 120 may be inserted into or received in the guide element 138. The end stops 128, 129 may then be partially inserted into the ends of the guide element and generally aligned with the fastener opening of the channel portion 126 (to properly locate the end stops and guide element within the channel portion), whereby the fasteners 140 are threaded into and tightened at the channel portion and end stops (such as in a threaded passageway 128f at the base portion 128a of the end stop) to retain the end stops at the channel portion and to retain the guide element within the channel portion. The cables are routed through the end stop passageways and the sheaths are seated in the sheath passageways of the end stops and the cables are connected to the carrier 130. Operation of the drive motor 132a then moves the cables 134a relative to the sheaths 134b and end stops 128, 129 to move the movable window 120 and carrier 130 along the guide element 138 and between the end stops 128, 129.

Thus, the present invention provides end stops or cable guide for a movable window that are received in the channel portion of the lower rail of a rear slider window assembly. The end stops not only provide a cable guiding function to anchor the cable sheath and guide the inner cable during operation of the drive motor, but the end stops also function to anchor or retain the guide element for the movable window carrier within the channel portion. The end stops thus function to properly locate the guide element along the channel portion and obviate the need for additional fasteners or adhesives or the like that may otherwise be needed to attach the guide element at the channel portion.

Optionally, the fixed window panels and movable window panel of the window assemblies 10, 110, discussed above, may include one or more electrically conductive elements, such as heater grids or the like, which may be powered utilizing aspects of the window assemblies described in U.S. Pat. No. 8,402,695, and/or PCT Application No. PCT/US2011/051506, filed Sep. 13, 2011 and published on Mar. 22, 2012 as International Publication No. WO2012/037190, which are hereby incorporated herein by reference in their entireties. The window assembly may include a heater grid on each of the fixed window panels and on the movable window panels, with a heating system that provides power to the heater grid on the movable window panel irrespective of the position of the movable window panel relative to the fixed window panel and throughout the range of movement of the movable window panel between its opened and closed positions, such as by utilizing aspects of the window assemblies described in U.S. Pat. No. 8,402,695, and/or PCT Application No. PCT/US2011/051506, filed Sep. 13, 2011 and published on Mar. 22, 2012 as International Publication No. WO2012/037190, incorporated above.

In the illustrated embodiment of FIGS. 8-14H, the window assembly 110 includes a heater grid on each of the fixed window panels and on the movable window panels, with a heating system that provides power to the heater grid on the movable window panel irrespective of the position of the movable window panel relative to the fixed window panel and throughout the range of movement of the movable window panel between its opened and closed positions. As shown in FIGS. 8-10 and 12, electrical power may be provided to a heater grid of the movable window panel 120 via a flexible extendable and retractable cable 142 that is electrically connected at one end to terminals at the fixed window panel 118 and at the other end to terminals at the movable window panel 120. The flexible cable flexes and folds over on itself as the movable window panel is moved towards its opened position. As can be seen with reference to FIGS. 8-10 and 14B, a cover element 144 may be disposed along the channel portion 126 at fixed window panel 118 to cover the flexible cable 142 when the movable window panel is in its closed position. When the movable window panel is moved towards its opened position, the cover element 144 may flex and move as it is contacted by the movable window panel. The cover element may comprise any suitable covering means, such as a flexible rubber material or the like, and may comprise a flexible brush cover or element comprising a plurality of flexible plastic bristles or the like. The cover element 144 may be attached to or received in a mounting structure or element 146 that is attached (such as via a suitable adhesive or the like) at the outer surface of the wall of the channel portion 126.

The window assembly may provide a flush exterior surface with a single fixed window panel, with the movable panel movable along and behind the single fixed window panel between its opened and closed positions. The fixed window panel or panels may include an opaque coating or layer or frit layer or the like disposed about its perimeter and around the edges that bound the window opening, in order to conceal or hide or render covert the rails and sealing elements disposed at the fixed panel. Likewise, the movable window panel may include an opaque coating or layer or frit layer or the like disposed about its perimeter regions, in order to conceal or hide or render covert the sealing elements disposed at the fixed panel, such as when the movable window panel is in its closed position.

Optionally, the window assembly or assemblies of the present invention may utilize aspects of the window assemblies described in U.S. Pat. Nos. 8,402,695; 7,073,293; 7,003,916; 6,119,401; 6,026,611; 5,996,284; 5,799,444; and/or 6,691,464, and/or U.S. patent application Ser. No. 11/263,221, filed Oct. 31, 2005 and published May 25, 2006 as U.S. Publication No. 2006-0107600; Ser. No. 11/948,094, filed Nov. 30, 2007, published Jun. 5, 2008 as U.S. Publication No. 2008-0127563; Ser. No. 10/454,040, filed Jun. 4, 2003 and published Feb. 5, 2004 as U.S. Publication No. 2004-0020131; and/or Ser. No. 10/408,047, filed Apr. 4, 2003 and published Nov. 20, 2003 as U.S. Publication No. 2003-0213179, and/or PCT Application No. PCT/US2011/051506, filed Sep. 13, 2011 and published on Mar. 22, 2012 as International Publication No. WO2012/037190, and/or PCT Application No. PCT/US2011/066522, filed Dec. 21, 2011 and published Jun. 28, 2012 as International Publication No. WO 2012/088287, and/or PCT Application No. PCT/US2012/034916, filed Apr. 25, 2010 and published Nov. 1, 2012 as International Publication No. WO 2012/148968, and/or U.S. provisional application Ser. No. 61/559,392, filed Nov. 14, 2011, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A slider window assembly for a vehicle, said slider window assembly comprising:
    a frame portion having an upper rail and a lower rail;
    at least one fixed window panel that is fixed relative to said frame portion, said at least one fixed window panel defining an opening;
    a movable window panel that is movable along said upper rail and said lower rail, wherein said movable window panel is movable between a closed position, where said movable window panel is disposed at said opening, and an opened position, where said movable window panel is disposed at least partially along said at least one window panel;
    a carrier established at a lower portion of said movable window panel;
    wherein said lower rail comprises a channel portion that extends at least partially along said at least one fixed window panel;
    a guide element disposed in and at least partially along said channel portion and configured to receive said carrier therein;
    wherein said carrier is configured to move along said guide element in said channel portion of said lower rail;
    a pair of cable guides, wherein said cable guides are disposed in said channel portion and at respective ends of said guide element, and wherein said cable guides each comprise a base portion configured to be secured at said channel portion and a guide element retaining portion extending from said base portion and along said channel portion;
    wherein said guide element retaining portions of said cable guides, when said base portions of said cable guides are secured relative to said channel portion, engage respective ends of said guide element to retain said guide element in said channel portion;
    wherein each of said cable guides is configured to engage or receive a respective sheath of a cable assembly of a cable drive system, with a cable of said cable assembly being attached at respective ends of said carrier, whereby pulling at said cable imparts a movement of said carrier along said lower rail; and wherein said base portion of each of said cable guides is secured to said channel portion of said lower rail via a fastener that is received through an aperture in a side wall of said channel portion and received in a threaded passageway of said base portion.

2. The slider window assembly of claim 1, wherein said guide element retaining portion of each of said cable guides is configured to be at least partially received in the respective end of said guide element to engage the respective end of said guide element and retain said guide element in said channel portion.

3. The slider window assembly of claim 1, wherein said cable drive system comprises first and second cable assemblies that are guided by respective ones of said cable guides at end regions of said channel portion of said lower rail, wherein said first cable assembly includes a first sheath that is retained at one of said cable guides and a first cable that extends along said channel portion and is connected to said carrier, and wherein said second cable assembly includes a second sheath that is retained at the other of said cable guides, and a second cable that extends along said channel portion and is connected to said carrier, and wherein said cable drive system is operable to move said carrier and said movable window panel along said lower rail via pulling one of said first and second cables.

4. The slider window assembly of claim 3, wherein said one of said cable guides comprises a sheath receiving portion that at least partially receives said first sheath therein, and wherein said first cable passes through a cable passageway at said sheath receiving portion, such that, when said first cable is pulled to move said carrier and said movable window panel, said sheath receiving portion limits movement of said first sheath at or near the end region of said channel portion.

5. The slider window assembly of claim 1, wherein said at least one fixed window panel comprises first and second fixed window panels defining an opening therebetween.

6. The slider window assembly of claim 1, wherein said at least one fixed window panel comprises a single fixed window panel having an opening therethrough.

7. The slider window assembly of claim 1, wherein said base portions of said cable guides have a width greater than a width of said guide element retaining portions of said cable guides, and wherein each of said cable guides has a surface that abuts against the respective end of said guide element when said guide element retaining portions are received in said guide element at the respective ends of said guide element.

8. The slider window assembly of claim 1, wherein said guide element comprises at least one leg element that engages a lower wall of said channel portion of said lower rail and spaces said guide element above said lower wall of said channel portion of said lower rail, and wherein said guide element comprises at least one tab element at an upper region of said guide element to limit upward movement of said carrier when said carrier is received in said guide element.

9. A slider window assembly for a vehicle, said slider window assembly comprising:
    a frame portion having an upper rail and a lower rail, wherein said lower rail comprises a channel portion;
    at least one fixed window panel that is fixed relative to said frame portion, said at least one fixed window panel defining an opening;
    a movable window panel that is movable along said upper rail and said lower rail, wherein said movable window panel is movable between a closed position, where said movable window panel is disposed at said opening, and an opened position, where said movable window panel is disposed at least partially along said at least one window panel;
    a carrier established at a lower portion of said movable window panel; and
    a guide element disposed at least partially along said channel portion and having a guide channel configured to receive said carrier therein;
    wherein said carrier is configured to move along said guide element in said channel portion of said lower rail;
    cable guides established at opposite ends of said lower rail and each cable guide configured to engage or receive a respective sheath of a cable assembly of a cable drive system, with a cable of said cable assembly being attached at a respective end of said carrier, whereby pulling at said cable imparts a movement of said carrier along said guide element and said lower rail;
    wherein each of said cable guides comprises a base portion and a guide element retaining portion extending from said base portion;
    wherein said cable guides are disposed in said channel portion and at respective ends of said guide element, and wherein said base portion is secured at said channel portion and wherein said guide element retaining portion is at least partially received in said guide channel of said guide element, and wherein said guide element retaining portions of said cable guides, when said base portions are secured relative to said channel portion, engage respective ends of said guide element to retain said guide element in said channel portion; and wherein said guide element comprises at least one tab element at an upper region of said guide channel to limit upward movement of said carrier when said carrier is received in said guide channel of said guide element.

10. The slider window assembly of claim 9, wherein said channel portion comprises a generally U-shaped channel comprising a lower wall and a pair of spaced apart generally vertical walls extending from said lower wall.

11. The slider window assembly of claim 9, wherein said cable drive system comprises first and second cable assemblies that are guided by respective ones of said cable guides at end regions of said channel portion of said lower rail, wherein said first cable assembly includes a first sheath that is retained at one of said cable guides and a first cable that extends along said channel portion and is connected to said carrier, and wherein said second cable assembly includes a second sheath that is retained at the other of said cable guides, and a second cable that extends along said channel portion and is connected to said carrier, and wherein said cable drive system is operable to move said carrier and said movable window panel along said lower rail via pulling one of said first and second cables.

12. The slider window assembly of claim 11, wherein said first sheath is received in a sheath receiving passageway of said base portion of said one of said cable guides and wherein said first cable passes through a cable passageway of said one of said cable guides, and wherein said second sheath is received in a sheath receiving passageway of said base portion of said other of said cable guides and wherein said second cable passes through a cable passageway of said other of said cable guides.

13. The slider window assembly of claim 9, wherein said at least one fixed window panel comprises first and second fixed window panels defining an opening therebetween.

14. The slider window assembly of claim 9, wherein said at least one fixed window panel comprises a single fixed window panel having an opening therethrough.

15. The slider window assembly of claim 9, wherein said base portions of said cable guides have a width greater than a width of said guide element retaining portions of said cable guides, and wherein said cable guides each have a surface that abuts against the respective end of said guide element when said guide element retaining portions are received in said guide element at the respective ends of said guide element.

16. The slider window assembly of claim 9, wherein said base portion of each of said cable guides is secured to said channel portion of said lower rail via a fastener that is received through an aperture in a side wall of said channel portion and received in a threaded passageway of said base portion.

17. The slider window assembly of claim 9, wherein said guide element comprises at least one leg element that engages a lower wall of said channel portion of said lower rail and spaces said guide channel above said lower wall of said channel portion of said lower rail.

\* \* \* \* \*

UNITED STATES PATENT AND TRADEMARK OFFICE
CERTIFICATE OF CORRECTION

PATENT NO.       : 8,938,914 B2                                 Page 1 of 1
APPLICATION NO.  : 13/891613
DATED            : January 27, 2015
INVENTOR(S)      : Michael Hulst and Tory Tooker It is certified that error appears in the above-identified patent and that said Letters Patent is hereby corrected as shown below:

Claims

Column 12
Line 20, Claim 7, insert --each-- after "guides";
Line 47, Claim 9, insert --fixed-- after "one";

Column 14
Line 14, Claim 15, insert --each-- after "guides".

Signed and Sealed this
Tenth Day of November, 2015

Michelle K. Lee
*Director of the United States Patent and Trademark Office*